United States Patent
Patchava et al.

(10) Patent No.: US 12,212,445 B2
(45) Date of Patent: Jan. 28, 2025

(54) MODIFIED DEMODULATION REFERENCE SIGNAL PATTERNS FOR ORTHOGONAL FREQUENCY-DIVISION MULTIPLEXING

(71) Applicant: QUALCOMM Incorporated, San Diego, CA (US)

(72) Inventors: Raviteja Patchava, San Diego, CA (US); Xiaoxia Zhang, San Diego, CA (US); Zhifei Fan, San Diego, CA (US); Jing Sun, San Diego, CA (US); Tao Luo, San Diego, CA (US); Junyi Li, Fairless Hills, PA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 17/859,369

(22) Filed: Jul. 7, 2022

(65) Prior Publication Data
US 2024/0015057 A1     Jan. 11, 2024

(51) Int. Cl.
| | |
|---|---|
| *H04L 27/26* | (2006.01) |
| *H04L 5/00* | (2006.01) |
| *H04W 72/12* | (2023.01) |
| *H04W 72/1263* | (2023.01) |

(52) U.S. Cl.
CPC ........ *H04L 27/2613* (2013.01); *H04L 5/0051* (2013.01); *H04L 27/26025* (2021.01); *H04L 27/2605* (2013.01); *H04W 72/1263* (2013.01)

(58) Field of Classification Search
CPC .......... H04L 27/26025; H04L 27/2605; H04L 27/2613; H04L 5/0039; H04L 5/0048; H04L 5/0051; H04L 5/0094; H04L 25/02; H04L 5/001; H04L 5/0023; H04L 5/14; H04W 72/1263
See application file for complete search history.

(56) References Cited

U.S. PATENT DOCUMENTS

2024/0155577 A1* 5/2024 Li .................... H04L 27/2613

FOREIGN PATENT DOCUMENTS

| WO | WO-2020069207 A1 | 4/2020 |
| WO | WO-2022246722 A1 | 12/2022 |

OTHER PUBLICATIONS

International Search Report and Written Opinion—PCT/US2023/068995—ISA/EPO—Oct. 12, 2023.

\* cited by examiner

*Primary Examiner* — Melvin C Marcelo
*Assistant Examiner* — Natali Pascual Peguero
(74) *Attorney, Agent, or Firm* — Holland & Hart LLP

(57) ABSTRACT

Methods, systems, and devices for wireless communications are described. A user equipment (UE) may receive first control signaling identifying a demodulation reference signal (DMRS) pattern that may be uniformly distributed in a time domain and a frequency domain. The DMRS pattern may include a first set of resource elements for the DMRS, a second set of resource elements for guard tones adjacent to and greater in frequency than the first set of resource elements, and a third set of resource elements for guard tones adjacent to and lower in frequency than the first set of resource elements. The UE may receive second control signaling that schedules a data signal to be communicated between the UE and a network node in a set of time-frequency resources. The UE may communicate the data signal according to the second control signaling and the DMRS according to the DMRS pattern.

30 Claims, 18 Drawing Sheets

MODIFIED DEMODULATION REFERENCE SIGNAL PATTERNS FOR ORTHOGONAL FREQUENCY-DIVISION MULTIPLEXING

FIELD OF TECHNOLOGY

The present disclosure relates to wireless communications, including modified demodulation reference signal (DMRS) patterns for orthogonal frequency-division multiplexing (OFDM).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network nodes, each supporting wireless communication for communication devices, which may be known as user equipment (UE). In some wireless communications systems, a communication device (e.g., one of a UE and a network node) may support a format for reporting channel state feedback, in which the communication device performs channel estimation using reference signals transmitted from another communication device (e.g., another of the UE and the network node). In some cases, existing channel estimation techniques may be deficient.

SUMMARY

The described techniques relate to improved methods, systems, devices, and apparatuses that support modified demodulation reference signal (DMRS) patterns for orthogonal frequency-division multiplexing (OFDM). For example, the described techniques provide a framework for transmitting DMRSs with guard tones. In some examples, a user equipment (UE) may receive first control signaling identifying a DMRS pattern that may be uniformly distributed in a time domain and a frequency domain. The DMRS pattern may include some resource elements for a DMRS and other resource elements for guard tones. For example, the DMRS pattern may include a first set of resource elements for the DMRS, a second set of resource elements for guard tones that are adjacent to and greater in frequency than the first set of resource elements, and a third set of resource elements for guard tones that are adjacent to and lower in frequency than the first set of resource elements. In some examples, the UE may receive second control signaling that schedules a data signal to be communicated between the UE and a network node in a set of time-frequency resources. In response to receiving the second control signaling, the UE may communicate the data signal and the DMRS across the set of time-frequency resources. For example, the UE may communicate (e.g., transmit or receive) the data signal according to the second control signaling and the DMRS according to the DMRS pattern.

A method for wireless communication at a UE is described. The method may include receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, receiving second control signaling scheduling a data signal to be communicated between the UE and a network node in a set of time-frequency resources, and communicating, across the set of time-frequency resources, the data signal according to the second control signaling and the DMRS according to the DMRS pattern.

An apparatus for wireless communication at a UE is described. The apparatus may include a processor, memory coupled with the processor, and instructions stored in the memory. The instructions may be executable by the processor to cause the apparatus to receive first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, receive second control signaling scheduling a data signal to be communicated between the UE and a network node in a set of time-frequency resources, and communicate, across the set of time-frequency resources, the data signal according to the second control signaling and the DMRS according to the DMRS pattern.

Another apparatus for wireless communication at a UE is described. The apparatus may include means for receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, means for receiving second control signaling scheduling a data signal to be communicated between the UE and a network node in a set of time-frequency resources, and means for communicating, across the set of time-frequency resources, the data signal according to the second control signaling and the DMRS according to the DMRS pattern.

A non-transitory computer-readable medium storing code for wireless communication at a UE is described. The code may include instructions executable by a processor to receive first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, receive second control signaling scheduling a data signal to be communicated between the UE and a network node in a set of time-frequency resources, and communicate, across the set of time-frequency resources, the data signal according to the second control signaling and the DMRS according to the DMRS pattern.

In some examples of the method, apparatuses, and non-transitory computer-readable medium described herein, communicating the data signal and the DMRS may include operations, features, means, or instructions for mapping the DMRS to the second set of one or more resource elements for the guard tones and mapping the DMRS to the third set of one or more resource elements for the guard tones.

In some examples of the method, apparatuses, and non-transitory computer-readable medium described herein, communicating the data signal and the DMRS may include operations, features, means, or instructions for mapping a zero-power signal to the second set of one or more resource elements for the guard tones and mapping the zero-power signal to the third set of one or more resource elements for the guard tones.

In some examples of the method, apparatuses, and non-transitory computer-readable medium described herein, the first set of one or more resource elements for the DMRS includes a set of multiple adjacent resource elements in the time domain, the frequency domain, or both, that form a block of resource elements.

In some examples of the method, apparatuses, and non-transitory computer-readable medium described herein, the first set of one or more resource elements for the DMRS includes a set of multiple blocks of resource element uniformly distributed in the time domain, each block of the set of multiple blocks including a set of multiple resource elements uniformly distributed in the time domain, the frequency domain, or both.

In some examples of the method, apparatuses, and non-transitory computer-readable medium described herein, a first spacing in the time domain for the set of multiple blocks of resource elements may be different from a second spacing in the time domain for the set of multiple resource elements.

Some examples of the method, apparatuses, and non-transitory computer-readable medium described herein may further include operations, features, means, or instructions for transmitting an indication of a capability of the UE to communicate DMRSs using adjacent resource elements in the time domain, the frequency domain, or both, where the DMRS pattern may be based on the capability.

In some examples of the method, apparatuses, and non-transitory computer-readable medium described herein, receiving the first control signaling identifying the DMRS pattern may include operations, features, means, or instructions for receiving an indication of a modulation and coding scheme (MCS), a subcarrier spacing, or both, to be used for wireless communications at the UE, where the DMRS pattern may be identified based on the MCS, the subcarrier spacing, or both.

In some examples of the method, apparatuses, and non-transitory computer-readable medium described herein, the DMRS pattern may be identified based on a ratio between a Doppler frequency associated with the wireless communications at the UE and the subcarrier spacing.

In some examples of the method, apparatuses, and non-transitory computer-readable medium described herein, receiving the first control signaling identifying the DMRS pattern may include operations, features, means, or instructions for receiving an indication of a DMRS configuration identifying the DMRS pattern.

In some examples of the method, apparatuses, and non-transitory computer-readable medium described herein, communicating the data signal and the DMRS may include operations, features, means, or instructions for transmitting, across the set of time-frequency resources, the data signal according to the second control signaling and the DMRS according to the DMRS pattern.

In some examples of the method, apparatuses, and non-transitory computer-readable medium described herein, communicating the data signal and the DMRS may include operations, features, means, or instructions for receiving, across the set of time-frequency resources, the data signal according to the second control signaling and the DMRS according to the DMRS pattern.

In some examples of the method, apparatuses, and non-transitory computer-readable medium described herein, the data signal includes an uplink shared channel signal, a downlink shared channel signal, an uplink control channel signal, or a downlink control channel signal.

A method for wireless communication at a network node is described. The method may include outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, outputting second control signaling scheduling a data signal to be communicated between a UE and the network node in a set of time-frequency resources, and communicating, across the set of time-frequency resources, the data signal according to the second control signaling and the DMRS according to the DMRS pattern.

An apparatus for wireless communication at a network node is described. The apparatus may include a processor, memory coupled with the processor, and instructions stored in the memory. The instructions may be executable by the processor to cause the apparatus to output first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, output second control signaling scheduling a data signal to be communicated between a UE and the network node in a set of time-frequency resources, and communicate, across the set of time-frequency resources, the data signal according to the second control signaling and the DMRS according to the DMRS pattern.

Another apparatus for wireless communication at a network node is described. The apparatus may include means for outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, means for outputting second control signaling scheduling a data signal to be communicated between a UE and the network node in a set of time-frequency resources, and means for communicating, across the set of time-frequency resources, the data signal according to the second control signaling and the DMRS according to the DMRS pattern.

A non-transitory computer-readable medium storing code for wireless communication at a network node is described. The code may include instructions executable by a processor to output first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, output second control signaling scheduling a data signal to be communicated between a UE and the network node in a set of time-frequency resources, and communicate, across the set of time-frequency resources, the data signal according to the second control signaling and the DMRS according to the DMRS pattern.

In some examples of the method, apparatuses, and non-transitory computer-readable medium described herein, communicating the data signal and the DMRS may include operations, features, means, or instructions for mapping the DMRS to the second set of one or more resource elements for the guard tones and mapping the DMRS to the third set of one or more resource elements for the guard tones.

In some examples of the method, apparatuses, and non-transitory computer-readable medium described herein, communicating the data signal and the DMRS may include operations, features, means, or instructions for mapping a zero-power signal to the second set of one or more resource elements for the guard tones and mapping the zero-power signal to the third set of one or more resource elements for the guard tones.

In some examples of the method, apparatuses, and non-transitory computer-readable medium described herein, the first set of one or more resource elements for the DMRS includes a set of multiple adjacent resource elements in the time domain, the frequency domain, or both, that form a block of resource elements.

In some examples of the method, apparatuses, and non-transitory computer-readable medium described herein, the first set of one or more resource elements for the DMRS includes a set of multiple blocks of resource element uniformly distributed in the time domain, each block of the set of multiple blocks including a set of multiple resource elements uniformly distributed in the time domain, the frequency domain, or both.

In some examples of the method, apparatuses, and non-transitory computer-readable medium described herein, a first spacing in the time domain for the set of multiple blocks of resource elements may be different from a second spacing in the time domain for the set of multiple resource elements.

Some examples of the method, apparatuses, and non-transitory computer-readable medium described herein may further include operations, features, means, or instructions for obtaining an indication of a capability of the UE to communicate DMRSs using adjacent resource elements in the time domain, the frequency domain, or both, where the DMRS pattern may be based on the capability.

In some examples of the method, apparatuses, and non-transitory computer-readable medium described herein, outputting the first control signaling identifying the DMRS pattern may include operations, features, means, or instructions for outputting an indication of a MCS, a subcarrier spacing, or both, to be used for wireless communications at the UE, where the DMRS pattern may be identified based on the MCS, the subcarrier spacing, or both.

In some examples of the method, apparatuses, and non-transitory computer-readable medium described herein, the DMRS pattern may be identified based on the MCS and a ratio between a Doppler frequency associated with the wireless communications at the UE and the subcarrier spacing.

In some examples of the method, apparatuses, and non-transitory computer-readable medium described herein, outputting the first control signaling identifying the DMRS pattern may include operations, features, means, or instructions for outputting an indication of a DMRS configuration identifying the DMRS pattern.

In some examples of the method, apparatuses, and non-transitory computer-readable medium described herein, communicating the data signal and the DMRS may include operations, features, means, or instructions for obtaining, across the set of time-frequency resources, the data signal according to the second control signaling and the DMRS according to the DMRS pattern.

In some examples of the method, apparatuses, and non-transitory computer-readable medium described herein, communicating the data signal and the DMRS may include operations, features, means, or instructions for outputting, across the set of time-frequency resources, the data signal according to the second control signaling and the DMRS according to the DMRS pattern.

In some examples of the method, apparatuses, and non-transitory computer-readable medium described herein, the data signal includes an uplink shared channel signal, a downlink shared channel signal, an uplink control channel signal, or a downlink control channel signal.

DETAILED DESCRIPTION

Figure 1:
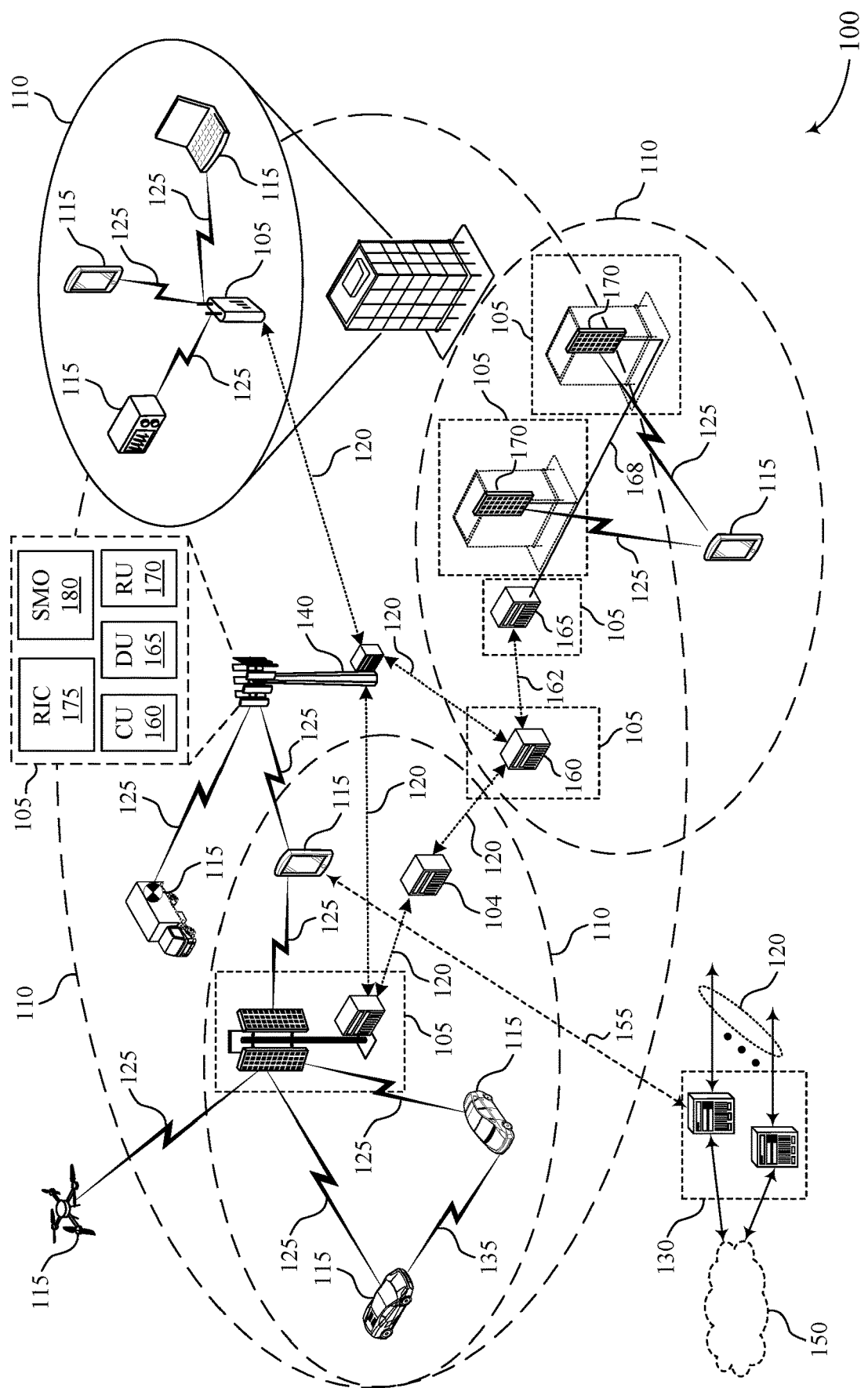
FIGS. 1 and 2 each illustrate an example of a wireless communications system that supports modified demodulation reference signal (DMRS) patterns for orthogonal frequency-division multiplexing (OFDM) in accordance with one or more aspects of the present disclosure.

In some wireless communications systems, wireless communication devices may communicate via directional transmissions (e.g., beams), in which beamforming may be applied (e.g., using one or more antenna elements) to form a beam in a direction. In some examples, beamforming applied at a communication device (e.g., to select, shape, or steer a directional beam along a spatial path) may be based on channel estimation performed at the communication, for example using reference signals transmitting by another communication device. For example, a first communication device may transmit reference signals (e.g., a demodulation reference signal (DMRS)) in a same set of time-frequency resources as data signals, such that a second communication device may use the DMRS to estimate a channel (e.g., channel conditions, radio conditions), in which the data signals (e.g., and the DMRS) are transmitted. That is, the first communication device may multiplex (e.g., using orthogonal frequency division multiplexing (OFDM)) the DMRS with the data signals for channel estimation at the second communication device. In such an example, the DMRS may be transmitted according to a comb pattern that may be repeating, but non-uniform (e.g., irregular, unequal, variable). For example, the DMRS may be mapped to resource elements (e.g., time-frequency resources) according to a comb pattern with non-uniform spacing in the time domain (e.g., non-uniform symbols spacing) and in the frequency domain (e.g., non-uniform subcarrier spacing).

In some examples, however, the first communication device (or the second communication device) may be a mobile device capable of traveling at relatively high speeds (e.g., about 30-500 kmph). In such examples, the signals transmitted between the first communication device and the second communication device (e.g., the data signals, the DMRS) may experience a frequency shift (e.g., a Doppler shift) and a quantity of DMRSs (e.g., a quantity of time-frequency resources occupied by the DMRS transmitted according to the non-uniform comb pattern) may be unsuitable (e.g., insufficient) to account for the frequency shift in the estimated channel. In some examples, the first communication device may transmit the DMRS according to one or more other DMRS patterns, such that the DMRS may be uniformly (e.g., regularly, with equal spacing in the time domain and the frequency domain) applied across a set of time-frequency resources allocated to the first communication device. In some examples, such DMRS patterns may lead to an increased quantity of time-frequency resources being occupied by the DMRS, thereby enabling the second communication device to estimate the frequency shift of the transmitted signals (e.g., the data signals, the DMRS). In such examples, however, an increased quantity of time-frequency resources being occupied by the DMRS may lead to interference (e.g., inter-carrier interference) between the data signals and DMRS (e.g., due to the frequency shift), which may degrade communications between the first communication device and the second communication device.

Various aspects of the present disclosure relate to techniques for modified DMRS patterns for orthogonal frequency-division multiplexing (OFDM), and more specifically, to a framework for transmitting the DMRS with guard tones. For example, the second communication device may indicate (e.g., using control signaling) a DMRS pattern to the first communication device. The DMRS pattern may identify (e.g., include) a first set of time-frequency resources for the DMRS and other sets (e.g., a second set and a third set) of time-frequency resources for the guard tones. In some examples, the first set of time-frequency resources for the DMRS may be uniformly spaced and the other sets of time-frequency resources for the guard tones may be adjacent to the time-frequency resources for the DMRS in the frequency domain. For example, the second set of time-frequency resources may be adjacent to and greater in frequency than the first set of time-frequency resources and the third set of time-frequency resources may be adjacent to and lower in frequency than the first set of time-frequency resources (e.g., and the second set of time-frequency resources).

In some examples, in response to receiving the indication, the first communication device may communicate with the second communication device according to the DMRS pattern. For example, the first communication device may transmit the DMRS across the first set of uniformly spaced (e.g., regularly spaced, equally spaced in the time domain and frequency domain) time-frequency resources and may apply the guard tones to the second set of time-frequency resources and the third sets of time-frequency resources. In some examples, zero-power signals may be mapped to the guard tones. Additionally, or alternatively, the DMRS may be mapped to the guard tones. In some examples, mapping zero-power signals or the DMRS to the guard tones may lead to reduced inter-carrier interference between the DMRS and neighboring data signals.

Aspects of the subject matter described herein may be implemented to realize one or more of the following potential advantages. For example, the techniques employed by the described communication devices may provide benefits and enhancements to the operation of the communication devices, including enabling frequency shift estimations, while reducing inter-carrier interference. In some examples, operations performed by the described communication devices may provide improvements to the reliability of communications within a wireless communications system. In some examples, the operations performed by the described communication devices to improve communication reliability within the wireless communications system may include transmitting control signaling that identifies a DMRS pattern including time-frequency resources for a DMRS and adjacent time-frequency resources for guard tones. In some other examples, operations performed by the described communication devices may also support increased throughput and higher data rates, among other possible benefits.

Aspects of the disclosure are initially described in the context of wireless communications systems. Aspects of the disclosure are also described in the context of resource mappings and a process flow. Aspects of the disclosure are further illustrated by, and described with reference to, apparatus diagrams, system diagrams, and flowcharts that relate to modified DMRS patterns for OFDM.

FIG. 1 illustrates an example of a wireless communications system 100 that supports modified DMRS patterns for OFDM in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network entity, a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with one or more additional network nodes 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support modified DMRS patterns for OFDM as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network nodes 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network nodes 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more sub-bands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support modified DMRS patterns for OFDM. For example, a UE 115 or a network node 105, or both, may support a framework for transmitting DMRSs with guard tones. In some examples, the UE 115 may receive first control signaling (e.g., from the network node 105) identifying a DMRS pattern that may be uniformly distributed in a time domain and a frequency domain. The DMRS pattern may include some resource elements (e.g., time-frequency resources) for a DMRS and other resource elements for guard tones (e.g., guard bands). For example, the DMRS pattern may include a first set of resource elements for the DMRS, a second set of resource elements for guard tones that are adjacent to and greater in frequency than the first set of resource elements, and a third set of resource elements for guard tones that are adjacent to and lower in frequency than the first set of resource elements (e.g., and the first set of resource elements). In some examples, the UE 115 may receive second control signaling that schedules a data signal to be communicated between the UE 115 and the network node 105 in a set of time-frequency resources. In response to receiving the second control signaling, the UE 115 may communicate the data signal and the DMRS across the set of time-frequency resources. For example, the UE 115 may communicate (e.g., transmit to network node 105 or receive from the network node 105) the data signal according to the second control signaling and the DMRS according to the DMRS pattern. In some examples, communicating the DMRS according to the DMRS pattern may enable frequency shift estimation (e.g., at the UE 115 or the network node 105, or both), while reducing inter-carrier interference, among other possible benefits.

Figure 2:
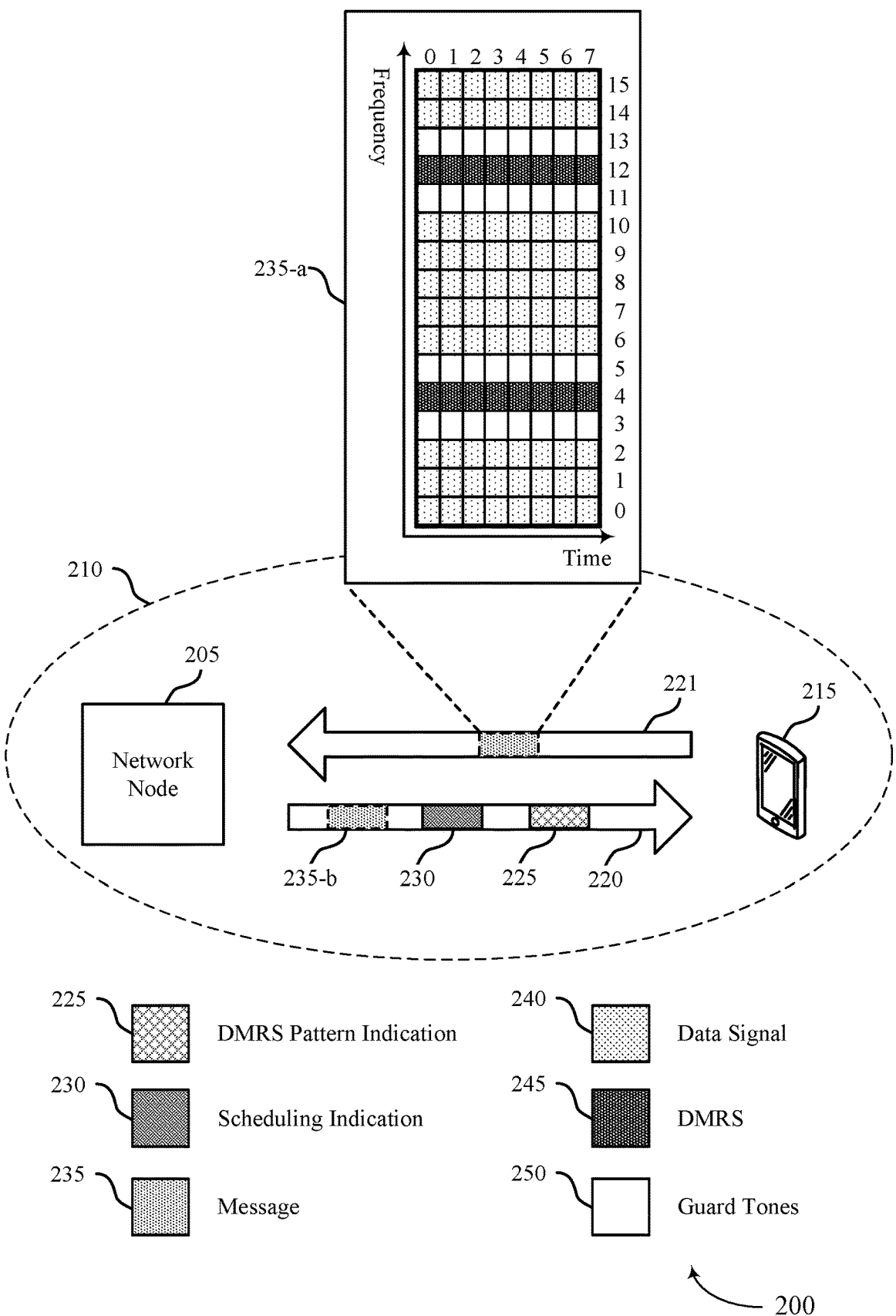

FIG. 2 illustrates an example of a wireless communications system 200 that supports modified DMRS patterns for OFDM in accordance with one or more aspects of the present disclosure. In some examples, the wireless communications system 200 may implement aspects of the wireless communications system 100. For example, the wireless communications system 200 may include a UE 215 and a network node 205, which may be examples of the corresponding devices as described with reference to FIG. 1. The network node 205 may operate within a coverage area 210. The coverage area 210 may be an example of a coverage area 110 as described with reference to FIG. 1. The UE 215 may communicate with the network node 205 via one or more communication links. For example, the UE 215 may receive downlink communications from the network node 205 via a downlink 220 and may transmit uplink communications to the network node 205 via an uplink 221. In some examples, the downlink 220 and the uplink 221 may each be an example of a communication link 125 as described with reference to FIG. 1.

In some examples of the wireless communications system 200, a communication device (e.g., one of the network node 205 and the UE 215) may use reference signals (e.g., a DMRS 245) transmitted from another communication device (e.g., the other of the network node 205 or the UE 215) for channel estimation (e.g., to estimate channel conditions, to estimate radio conditions). For example, the communication device may use the DMRS 245 to estimate a channel which may (e.g., subsequently) be used for data equalization. That is, DMRS 245 may be used for equalization of data signals (e.g., a data signal 240) transmitted with the DMRS 245. Some DMRS structures (e.g., for a physical downlink control channel (PDCCH), a physical downlink shared channel (PDSCH), a physical uplink control channel (PUCCH), a physical uplink shared channel (PUSCH), or a physical broadcast channel (PBCH) in OFDM) may provide for multiple configurations (e.g., allow two different configurations) and mapping types (e.g., for transmitting a DMRS). For example, in the frequency domain, the DMRS 245 may occupy a percentage (e.g., 50%, 33%, or some other percentage) of a quantity of resources (e.g., time-frequency resources) allocated to the communication device (e.g., a total quantity of allocated resources). Additionally, or alternatively, in the time domain, the DMRS 245 may occupy a quantity of symbols (e.g., up to a maximum quantity of symbols, about four symbols, or an otherwise suitable quantity of signals). That is, in the time domain, the DMRS 245 may occupy a quantity of symbols that may be at or above a threshold level. In some examples, this threshold level may correspond to a quantity of DMRS sufficient to perform channel estimation and successfully decode (e.g., maintain or exceed a threshold percentage of successful decodes for the corresponding data, or maintain or be below a threshold retransmission rate) a corresponding channel associated with the DMRS (e.g., PDCCH, PDSCH, PUCCH, PUSCH, PBCH). As described herein, in the time domain, a resource element may be associated with a certain symbol or symbol period and, in the frequency domain, a resource element may be associated with a certain subcarrier.

In some examples, however, the communication device (e.g., the UE 215) may be a mobile device capable of traveling at relatively high speeds (e.g., about 30-500 kph), which may lead to a frequency shift (e.g., a Doppler shift) in signals (e.g., the data signal 240, the DMRS 245) transmitted from the other communication device (e.g., the network node 205). In such an example, the accuracy of channel estimation performed at the UE 215 (e.g., using the DMRS 245) may be reduced. For example, a frequency shift of a signal (e.g., a frequency offset of a signal transmitted between the UE 215 and the network node 205) may result from a Doppler shift in the signal due to relative motion between the UE 215 and the network node 205. That is, users with a high Doppler spread (e.g., users on a high speed train (HST) with a speed up to about 500 kmph) may inaccurately estimate the channel due to one or more factors. For example, if a signal is transmitted to (or from) the UE 215 (e.g., that may be a user traveling at relatively high speeds, such as on the HST), an estimation of inter-carrier interference using the signal may be relatively difficult to obtain in the frequency domain (e.g., due to the Doppler shift). Additionally, or alternatively, a quantity of DMRS symbols (e.g., at totally quantity of DMRS symbols, about four DMRS symbols) may be insufficient to track channel variations that may occur due to the relatively high speeds of the UE 215 (e.g., of the user traveling on the HST). That is, some DMRS configurations and mapping types may be insufficient (e.g., may provide an insufficient quantity of DMRSs) for the UE 215 (or the network node 205) to track relatively highly varying channel variations (e.g., to track a channel that may be varying at a relatively high rate compared to a rate at which the channel estimation may be performed).

In some examples, a uniformly spaced (e.g., uniformly spaced in the time domain and uniformly spaced the frequency domain) DMRS pattern for an OFDM waveform may enable time-varying channel estimation (e.g., relatively simple time-varying channel estimations) for relatively high Doppler scenarios. For example, according to such patterns, the DMRS 245 may be placed uniformly in the time domain and the frequency domain. In some examples, a uniformly spaced DMRS pattern may refer to a repeating pattern of tones (e.g., resource elements, time-frequency resources) with uniform spacing in the time domain (e.g., uniformly spaced over a particular set of time domain resources, a particular set of symbols, a particular set of sub-frames, a particular set of frames, or a particular quantity of ms), the frequency domain (e.g., uniformly spaced over a particular set of frequency domain resources, a particular bandwidth, or a particular quantity of subcarriers), or both. In some examples, uniform spacing (e.g., regular spacing, sustained spacing, static spacing, fixed spacing) may refer to a spacing between resource elements (e.g., in the time domain or the frequency domain, or both) that is equal and repeating. For example, in the time domain, the DMRS 245 may be mapped to each resource element, with a spacing of one resource element, with a spacing of two resource elements, or with a spacing of three resource elements, among other examples.

As illustrated in the example of FIG. 2, an example resource allocation for DMRS symbols (e.g., symbols occupied by the DMRS 245) in accordance with such patterns may include a spacing of about seven subcarriers (e.g., seven subcarriers or resource elements in the frequency domain between DMRS resources) and continuous (e.g., each, all) symbols (e.g., resource elements in the time domain). For example, the DMRS 245 may be mapped to a set of resource elements with symbol indices 0 through 7 and a subcarrier index 4 and another set of resource elements with symbol indices 0 through 7 and a subcarrier index of 12 in a resource allocation, such that the sets of resource elements occupied by the DMRS 245 may be separated in frequency by about seven subcarriers. In some examples, the DMRS 245 may include a Zadoff-Chu sequence, a Gold sequence, an m-sequence, or any other suitable type of sequence, for example any sequence have relatively low cross-correlation, substantially no cross-correlation, no cross-correlation, are uncorrelated, or have a cross-correlation at or below some threshold correlation value.

In some examples, such DMRS patterns (e.g., DMRS patterns with uniform spacing) may lead to inter-carrier interference from data signals occupying neighboring subcarriers. For example, a frequency shift in signals (e.g., a frequency offset from a Doppler shift in the data signal 240 or the DMRS 245, or both, due to relative motion (e.g., speed toward or away) between the UE 215 and the network node 205) may lead to a loss of orthogonality between subcarriers. Additionally or alternatively the signals (e.g., the data signal 240 or the DMRS 245, or both) transmitted on each subcarrier may not be independent of each other, which may lead to inter-subcarrier interference. That is, the DMRS 245 may be multiplexed (e.g., using OFDM) with the data signal 240 in the frequency domain and, for relatively high Doppler channels (e.g., due to inter-carrier interference (ICI)), the DMRS 245 may experience interference from the data signal 240, which may affect the channel estimation performance. For example, a DMRS pattern in which the DMRS 245 is mapped to subcarriers that neighbor subcarriers occupied by the data signal 240 may experience inter-carrier interference between the DMRS 245 and the data signal 240 due to the frequency offset from a Doppler shift in the respective signals (e.g., due to relative motion between the UE 215 and the network node 205).

In some examples, modified DMRS patterns for OFDM, as described herein, may provide one or more benefits to time-varying channel estimation. For example, to avoid inter-carrier interference from the data signal 240 (e.g., subcarriers occupied by the data signal 240) to the DMRS 245 in OFDM, the UE 215 or the network node 205 (or both) may employ one or more modified DMRS patterns for OFDM, as described herein. For example, the UE 215 or the network node 205 (or both) may support (e.g., introduce) guard tones 250 (e.g., guard bands) around the DMRS 245 that may be occupied by the DMRS 245 (e.g., additional DMRS in the guard bands or on the guard tones) or zero-power signals. That is, a transmitting device (e.g., one of the UE 215 and the network node 205) may apply (e.g., place, transmit, configure) guard tones 250 around the DMRS 245 in frequency to reduce (e.g., avoid) interference from the data signal 240 (e.g., neighboring data signals). The guard tones 250 may be applied uniformly, for example to reduce the interference (e.g., inter-carrier interference), which may be circulant in nature. In some examples, a receiving device (e.g., the other of the UE 215 and the network node 205) may process the guard tones 250 (e.g., non-zero signals or the DMRS 245 mapped to the guard tones) to estimate the time-varying (e.g., delay-Doppler domain) channel. For example, the receiving device may use the guard tones 250 (e.g., the non-zero signals or DMRS 245 mapped to the guard tones) to determine a Doppler shift (e.g., Doppler variation) of the data signal 240 (e.g., transmitted with the DMRS 245).

As illustrated in the example of FIG. 2, the UE 215 may receive a DMRS pattern indication 225 (e.g., control signaling, such as RRC signaling)) identifying a DMRS pattern that may be uniformly distributed in a time domain and a frequency domain. The DMRS pattern may include some resource elements for the DMRS 245 and other resource elements for the guard tones 250. For example, the DMRS pattern may include a first set of resource elements (e.g., the resource elements with symbol indices 0 through 7 and a subcarrier indices 4 and 12) for the DMRS 245, a second set of resource elements (e.g., the resource elements with symbol indices 0 through 7 and subcarrier indices 5 and 13) for the guard tones 250 that are adjacent to and greater in frequency than the first set of resource elements, and a third set of resource elements (e.g., the resource elements with symbol indices 0 through 7 and subcarrier indices 3 and 11) for the guard tones 250 that are adjacent to and lower in frequency than the first set of resource elements (e.g., and the first set of resource elements). That is, a first portion of the second set of resource elements (e.g., the resource elements with symbol indices 0 through 7 and a subcarrier index of 5) may be adjacent to and greater in frequency than a first portion of the first set of resource elements (e.g., the resource elements with symbol indices 0 through 7 and a subcarrier index of 4) and a first portion of the third set of resource elements (e.g., the resource elements with symbol indices 0 through 7 and a subcarrier index of 3) may be adjacent to and lower in frequency than the first portion of the first set of resource elements (e.g., the resource elements with symbol indices 0 through 7 and a subcarrier index of 4).

In some examples, the UE 215 may receive a scheduling indication 230 (e.g., second control signaling, such as downlink control information (DCI)) that schedules a data signal to be communicated between the UE 215 and the network node 205 in a set of time-frequency resources. In response to receiving the scheduling indication 230, the UE 215 may communicate a message 235 (e.g., a message 235-*a*, a message 235-*b*) that may include the data signal 240 and the DMRS 245. For example, the UE 215 may transmit the message 235-*a* (or receive the message 235-*b*), such that the data signal 240 may be transmitted according to the scheduling indication 230 and the DMRS 245 may be transmitted according to the DMRS pattern (e.g., indicated using the DMRS pattern indication 225). That is, according to the DMRS pattern, the DMRS 245 may be mapped to the first set of resource elements (e.g., the resource elements with symbol indices 0 through 7 and subcarrier indices 4 and 12) and the guard tones 250 may be mapped to the second set of resource elements (e.g., the resource elements with symbol indices 0 through 7 and subcarrier indices 5 and 13) and the third set of resource elements (e.g., the resource elements with symbol indices 0 through 7 and subcarrier indices 3 and 11). In some examples, communicating the DMRS 245 according to the DMRS pattern may enable frequency shift estimation (e.g., at the UE 215 or the network node 205, or both), while reducing inter-carrier interference from the data signal 240 and the DMRS 245, among other possible benefits.

Figure 3A:
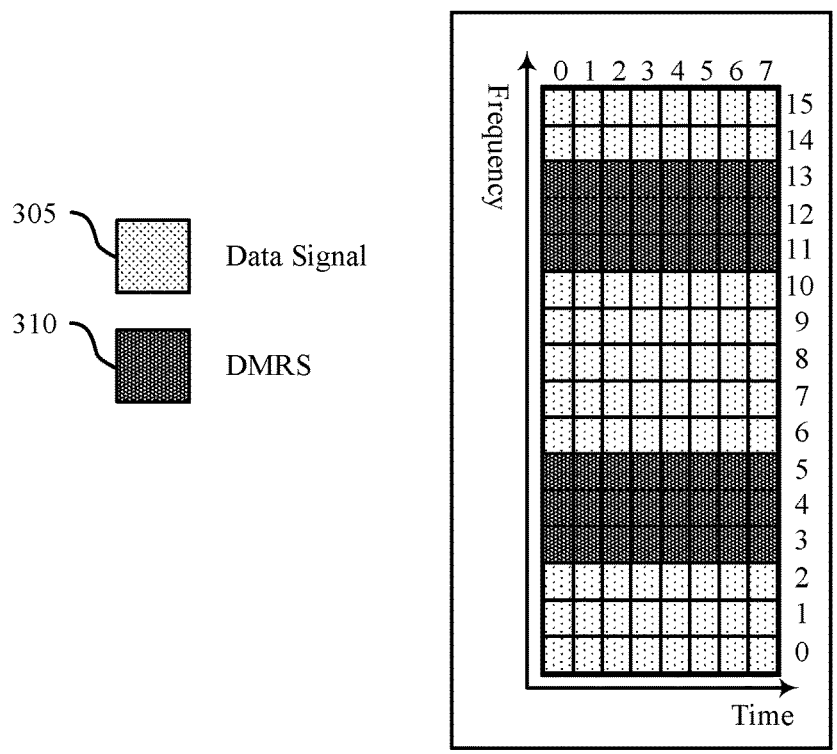
FIGS. 3A, 3B, 4A, 4B, 5A, and 5B each illustrate an example of a resource mapping that supports modified DMRS patterns for OFDM in accordance with one or more aspects of the present disclosure.
Figure 3B:
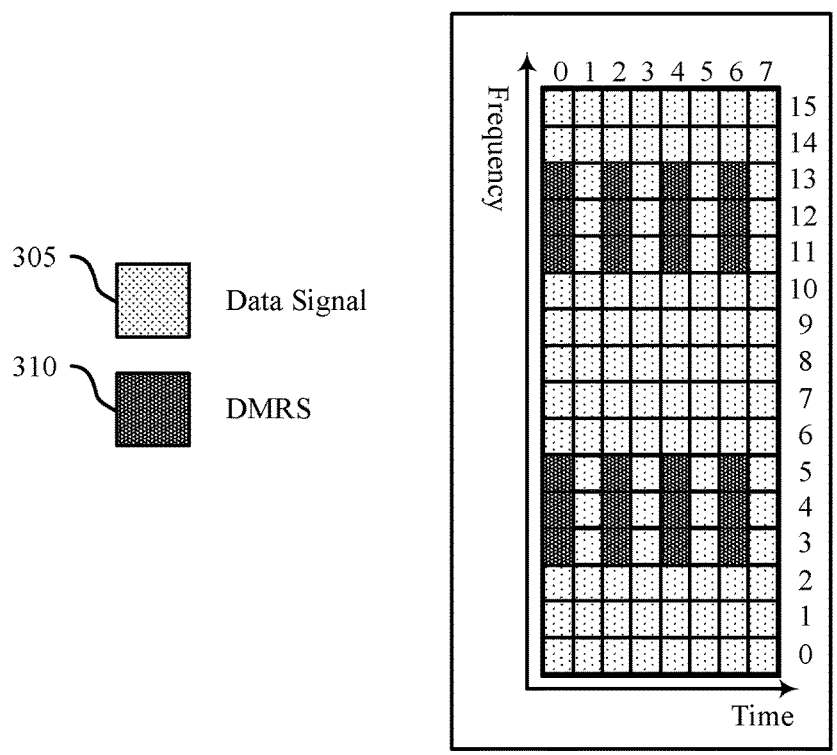

FIGS. 3A and 3B each illustrate an example of a resource mapping 300 (e.g., a resource mapping 300-*a* and a resource mapping 300-*b*, respectively) that supports modified DMRS patterns for OFDM in accordance with one or more aspects of the present disclosure. In some examples, the resource mapping 300-*a* and the resource mapping 300-*b* may implement aspects of the wireless communications system 100 and the wireless communications system 200. For example, the resource mapping 300-*a* and the resource mapping 300-*b* may be implemented at UE, a network node, or both, which may be examples of the corresponding devices as described with reference to FIGS. 1 and 2.

In some examples, the UE or the network node (or both) may transmit a DMRS 310 according to one or more modified DMRS patterns for OFDM, as described herein. For example, the UE or the network node (or both) may apply guard tones around resource elements occupied by the DMRS 310 (e.g., in a frequency domain) to reduce inter-carrier interference between the DMRS 310 and neighboring data signals (e.g., resources elements occupied by a data signal 305 that may be neighboring resource elements occupied by the DMRS 310). In some examples, the DMRS 310 may be mapped to the guard tones, such as to form a clustered DMRS structure. For example, the clustered DMRS structure may include multiple adjacent resource elements in the time domain, the frequency domain, or both, that form a block of resource elements for the DMRS 310. In some examples, the UE or the network node (or both) may apply (e.g., place) the DMRS clusters (e.g., the blocks of resource elements occupied by the DMRS 310) uniformly in the time-frequency plane.

For example, the DMRS pattern (e.g., including a clustered DMRS structure) may include a first set of resource elements for the DMRS 310 as well as a second set of resource elements and a third set of resource elements for the guard tones. In such examples, the DMRS 310 may be mapped to the first set of resource elements, the second set of resource elements, and the third set of resource elements. In such an example, signaling overhead may be reduced (e.g., compared to other examples, such as examples in which zero-power signals may be mapped to the guard tones). Additionally, or alternatively, mapping the DMRS 310 to the guard tones may lead to relatively higher channel estimation receiver complexity, for example to extract the delay-Doppler channel (e.g., a relatively simple two dimensional (2D) discrete Fourier transform (DFT) may not be applied to estimate the delay-Doppler channel). In some examples, the delay-Doppler channel may refer to a communication channel mapped in a delay-Doppler domain. In some examples, the UE or the network node (or both) may utilize a delay-Doppler channel to extract geometric information, to compute received power measurements (e.g., signal-to-interference-plus-noise ratio (SINR) measurements), and to predict channel state information using reference signals, such as the DMRS 310.

In some examples, according to the DMRS pattern, the DMRS 310 may be mapped to adjacent (e.g., each) resource element in the time domain. For example, as illustrated in the example of FIGS. 3A, the first set of resource elements may include resource elements with symbol indices 0 through 7 and subcarrier indices 4 and 12, the second set of resource elements may include the resource elements with symbol indices 0 through 7 and subcarrier indices 5 and 13, and the third set of resource elements may include the resource elements with symbol indices 0 through 7 and subcarrier indices 3 and 11.

Additionally, or alternatively, according to the DMRS pattern, the DMRS 310 may be mapped with a spacing of about one resource element (e.g., to alternating resource elements) in the time domain. For example, as illustrated in the example of FIGS. 3B, the first set of resource elements may include resource elements with symbol indices 0, 2, 4, and 6 and subcarrier indices 4 and 12, the second set of resource elements may include the resource elements with symbol indices 0, 2, 4, and 6 and subcarrier indices 5 and 13, and the third set of resource elements may include the resource elements with symbol indices 0, 2, 4, and 6 and subcarrier indices 3 and 11. Although the example of FIG. 3B illustrates the DMRS 310 being mapped with a spacing of about one resource element in the time domain, it is to be understood that the DMRS 310 may be mapped according to any spacing that may be uniform (e.g., equal and repeating). In some examples, mapping the DMRS 310 according to the DMRS pattern may enable frequency shift estimation (e.g., at the UE or the network node, or both), while reducing inter-carrier interference.

Figure 4A:
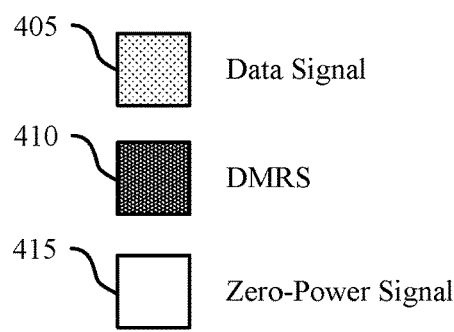
Figure 4A:
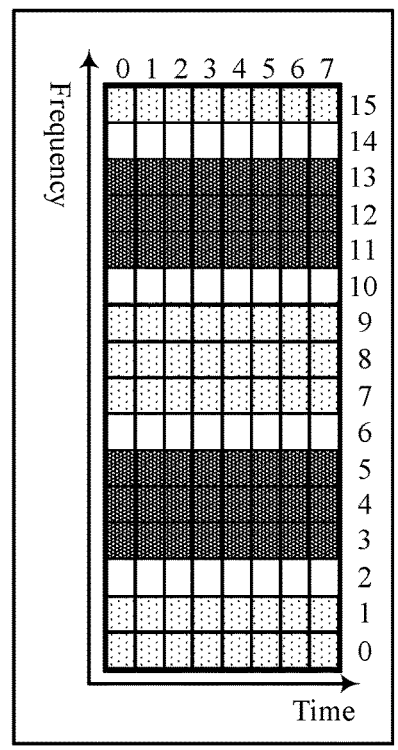
Figure 4B:
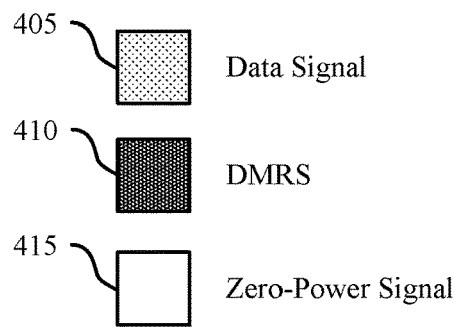
Figure 4B:
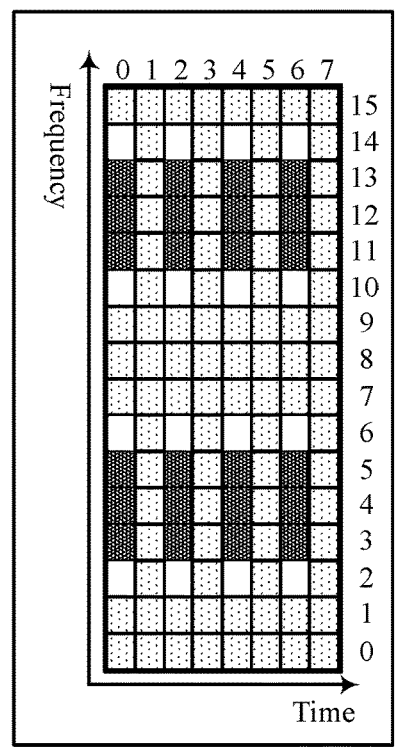

FIGS. 4A and 4B each illustrate an example of a resource mapping 400 (e.g., a resource mapping 400-*a* and a resource mapping 400-*b*, respectively) that supports modified DMRS patterns for OFDM in accordance with one or more aspects of the present disclosure. In some examples, the resource mapping 400-*a* and the resource mapping 400-*b* may implement aspects of the wireless communications system 100, the wireless communications system 200, and the resource mappings 300. For example, the resource mapping 400-*a* and the resource mapping 400-*b* may be implemented at UE, a network node, or both, which may be examples of the corresponding devices as described with reference to FIGS. 1, 2, 3A, and 3B.

In some examples, the UE or the network node (or both) may transmit a DMRS 410 according to one or more modified DMRS patterns for OFDM, as described herein. For example, according to a DMRS pattern, the UE or the network node (or both) may transmit the DMRS 410 (e.g., with a data signal 405) according to a clustered DMRS structure with guard tones at the edges of each cluster. As illustrated in the examples of FIGS. 4A and 4B, a zero-power signal 415 may be mapped to the guard tones. In some examples, the clustered DMRS structure may be an example of a clustered DMRS structure as described with reference to FIGS. 3A and 3B. For example, the clustered DMRS structure may include multiple adjacent resource elements in the time domain, the frequency domain, or both, that form a block of resource elements occupied by a DMRS 410.

The UE or the network node (or both) may apply (e.g., place) the DMRS clusters uniformly in the time-frequency plane. For example, the DMRS pattern (e.g., including the clustered DMRS structure with guard tones) may include a first set of resource elements for the DMRS 410 as well as a second set of resource elements and a third set of resource elements for the guard tones. In such examples, the DMRS 410 may be mapped to the first set of resource elements, while the zero-power signal 415 may be mapped to the second set of resource elements and the third set of resource elements (e.g., the guard tones, guard bands). In some examples, according to the DMRS pattern, the DMRS 410 and the zero-power signal 415 may be mapped to each resource element in the time domain. For example, as illustrated in the example of FIG. 4A, the first set of resource elements may include resource elements with symbol indices 0 through 7 and subcarrier indices 3 through 5 and 11 through 13, the second set of resource elements may include the resource elements with symbol indices 0 through 7 and subcarrier indices 6 and 14, and the third set of resource elements may include the resource elements with symbol indices 0 through 7 and subcarrier indices 2 and 10.

Additionally, or alternatively, according to the DMRS pattern, the DMRS 410 may be mapped with a spacing of about one resource element (e.g., to alternating resource elements) in the time domain. For example, as illustrated in the example of FIGS. 4B, the first set of resource elements may include resource elements with symbol indices 0, 2, 4, and 6 and subcarrier indices 3 through 5 and 11 through 13, the second set of resource elements may include the resource elements with symbol indices 0, 2, 4, and 6 and subcarrier indices 6 and 14, and the third set of resource elements may include the resource elements with symbol indices 0, 2, 4, and 6 and subcarrier indices 2 and 10. Although the example of FIG. 4B illustrates the DMRS 410 being mapped with a spacing of about one resource element in the time domain, it is to be understood that the DMRS 410 may be mapped according to any spacing that may be uniform (e.g., equal and repeating).

In some examples, a quantity of guard tones (e.g., a quantity of resource elements in which the zero-power signal 415 may be mapped) and a quantity of the DMRS 410 in each cluster (e.g., a quantity of resource elements in which the DMRS 410 may be mapped) may depend on a ratio between a Doppler frequency (e.g., a frequency shift associated with signals communicated between the UE and the network node) and a subcarrier spacing configured for wireless communications at the UE (e.g., wireless communications between the UE and the network node). Additionally, or alternatively, the quantity of guard tones and the quantity of the resource elements (e.g., for the DMRS 410) in each cluster (e.g., block of adjacent resource elements) may depend on a modulation and coding scheme (MCS) configured at the UE. That is, the quantity of resource elements included in the DMRS pattern for the DMRS 410 and the quantity of resource elements included in the DMRS pattern for guard tones (e.g., in which the zero-power signal 415 may be mapped) may depend on the subcarrier spacing or MCS (or both) configured at the UE for wireless communications.

For example, the network node may indicate a subcarrier spacing to the UE and the UE may select (e.g., determine, identify) a DMRS pattern based on a ratio between the Doppler shift (e.g., determined at the UE) and the indicated subcarrier spacing. Additionally, or alternatively, the network node may indicate a MCS to the UE (e.g., using a scheduling indication, such as a downlink or uplink scheduling grant) and the UE may select (e.g., determine, identify) the DMRS pattern based on the indicated MCS. In some examples, the network node may indicate the DMRS pattern (e.g., the quantity of resource elements included in the DMRS pattern for DMRS and the quantity of resource elements included in the DMRS pattern for guard tones) using a DCI or using RRC signaling.

In some examples, the network node may select a DMRS pattern based on UE capabilities. For example, channel estimation using DMRS transmitted according to the clustered DMRS structure (e.g., obtaining a single channel estimation using each DMRS 410 included in the clustered DMRS structure) may increase processing (e.g., complexity) at the UE. As such, the UE may transmit an indication of a capability of the UE to receive (e.g., and perform channel estimation using) DMRS 410 transmitted according to the clustered DMRS structure to the network node. In such an example, the network node may select (e.g., determine, identify) a DMRS pattern (e.g., to be indicated to the UE) based on the capability. In some examples, mapping the DMRS 410 and the zero-power signal 415 according to the DMRS pattern may enable frequency shift estimation (e.g., at the UE or the network node, or both), while reducing inter-carrier interference.

Figure 5A:
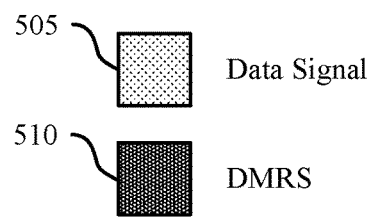
Figure 5A:
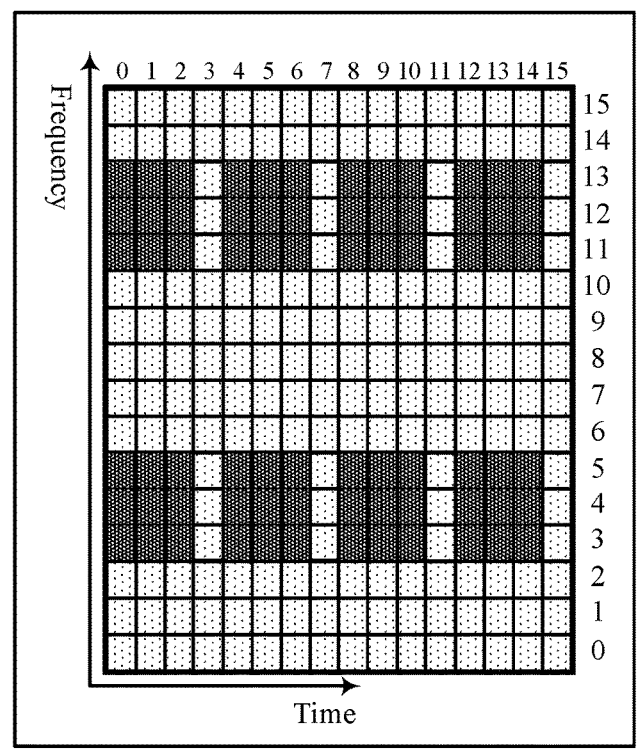
Figure 5B:
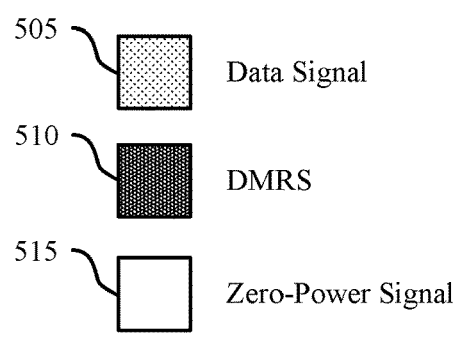
Figure 5B:
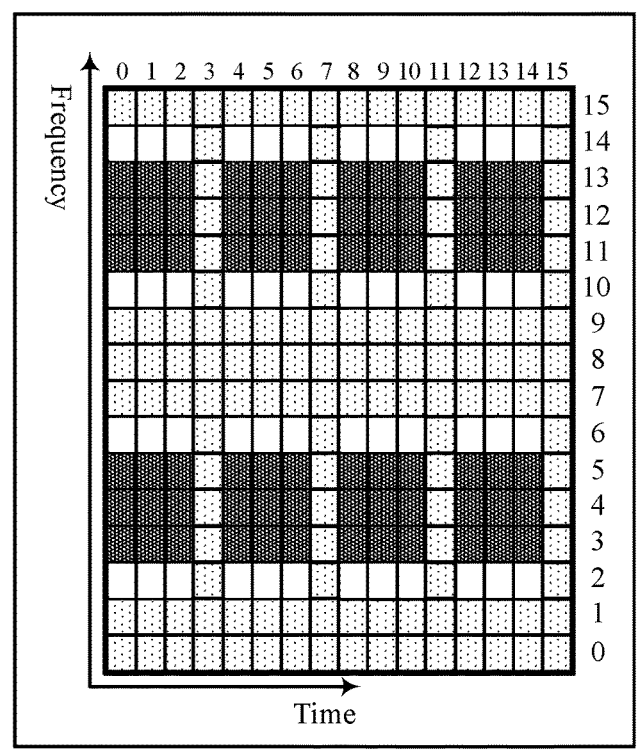

FIGS. 5A and 5B each illustrate an example of a resource mapping 500 (e.g., a resource mapping 500-*a* and a resource mapping 500-*b*) that supports modified DMRS patterns for OFDM in accordance with one or more aspects of the present disclosure. In some examples, the resource mapping 500-*a* and the resource mapping 500-*b* may implement aspects of the wireless communications system 100, the wireless communications system 200, the resource mappings 300, and the resource mappings 400. For example, the resource mapping 500-*a* and the resource mapping 500-*b* may be implemented at UE, a network node, or both, which may be examples of the corresponding devices as described with reference to FIGS. 1, 2, 3A, 3B, 4A, and 4B.

In some examples, the UE or the network node (or both) may transmit a DMRS 510 according to one or more modified DMRS patterns for OFDM, as described herein. For example, according to a DMRS pattern, the UE or the network node (or both) may transmit the DMRS 510 (e.g., with a data signal 505) according to a clustered DMRS structure (e.g., with or without guard tones). The clustered DMRS structure may be an example of a clustered DMRS structure as described with reference to FIGS. 3A, 3B, 4A, and 4B. For example, the clustered DMRS structure may include multiple adjacent resource elements in the time domain, the frequency domain, or both, that form a block of resource elements occupied by the DMRS 510. In some examples, the clustered DMRS structure may include multiple blocks of resource elements (e.g., multiple clusters) and each block may be applied (e.g., placed) uniformly in the time domain. Additionally, or alternatively, within each block, the resource elements may be applied (e.g., placed) according to a uniform spacing in the time domain and the frequency domain. That is, the DMRS pattern (e.g., including the clustered DMRS structure) may include a first set of resource elements that may include multiple blocks of resource element uniformly distributed in the time domain and each block may include multiple resource elements uniformly distributed in the time domain, the frequency domain, or both. In such an example, the uniform spacing in the time domain between the blocks may be the same as, or different from, the uniform spacing in the time domain of the resource elements within each block. That is, a spacing in the time domain for the multiple blocks of resource elements may be different from a spacing in the time domain for the multiple resource elements. For example, as illustrated in the example of FIG. 5A, the first set of resource elements may include resource elements with symbol indices 0-3,4-6,8-10, and 12-15 and subcarrier indices 3 through 5 and 11 through 13. Although the example of FIG. 5A illustrates the DMRS 510 being mapped to symbols 0-3,4-6,8-10, and 12-15 in the time domain and subcarrier indices 3 through 5 and 11 through 13 in the frequency domain, it is to be understood that the DMRS 510 may be mapped according to any spacing that may be uniform (e.g., equal and repeating).

Additionally, or alternatively, according to a DMRS pattern, the UE or the network node (or both) may transmit the DMRS 510 according to a clustered DMRS structure with guard tones at the edges of each cluster. As illustrated in the example of FIG. 5B, a zero-power signal 515 may be mapped to the guard tones. For example, the DMRS pattern (e.g., including the clustered DMRS structure with guard tones) may include the first set of resource elements that may include resource elements with symbol indices 0-3,4-6,8-10, and 12-15 and subcarrier indices 3 through 5 and 11 through 13, as well as a second set of resource elements and a third set of resource elements for the guard tones. In such examples, the DMRS 510 may be mapped to the first set of resource elements, while the zero-power signal 515 may be mapped to the second set of resource elements and the third set of resource elements (e.g., the guard tones). In some examples, the second set of resource elements may include the resource elements with symbol indices 0-3,4-6,8-10, and 12-15 and subcarrier indices 6 and 14 and the third set of resource elements may include the resource elements with symbol indices 0-3,4-6,8-10, and 12-15 and subcarrier indices 2 and 10. Although the example of FIG. 5B illustrates the DMRS 510 and the zero-power signal 515 being mapped to symbol indices 0-3, 4-6, 8-10, and 12-15 in the time domain, it is to be understood that the DMRS 510 and the zero-power signal 515 may be mapped according to any spacing that may be uniform (e.g., equal and repeating). In some examples, the network node may indicate a quantity of resource elements (e.g., to be occupied by the DMRS 510) in each block (e.g., cluster) as well as a quantity (e.g., a total quantity) of blocks using a DCI or RRC signaling. Additionally, or alternatively, the network node may indicate a quantity of guard tones (e.g., to be occupied by the zero-power signal 515) to the UE using the DCI or the RRC signaling.

Figure 6:
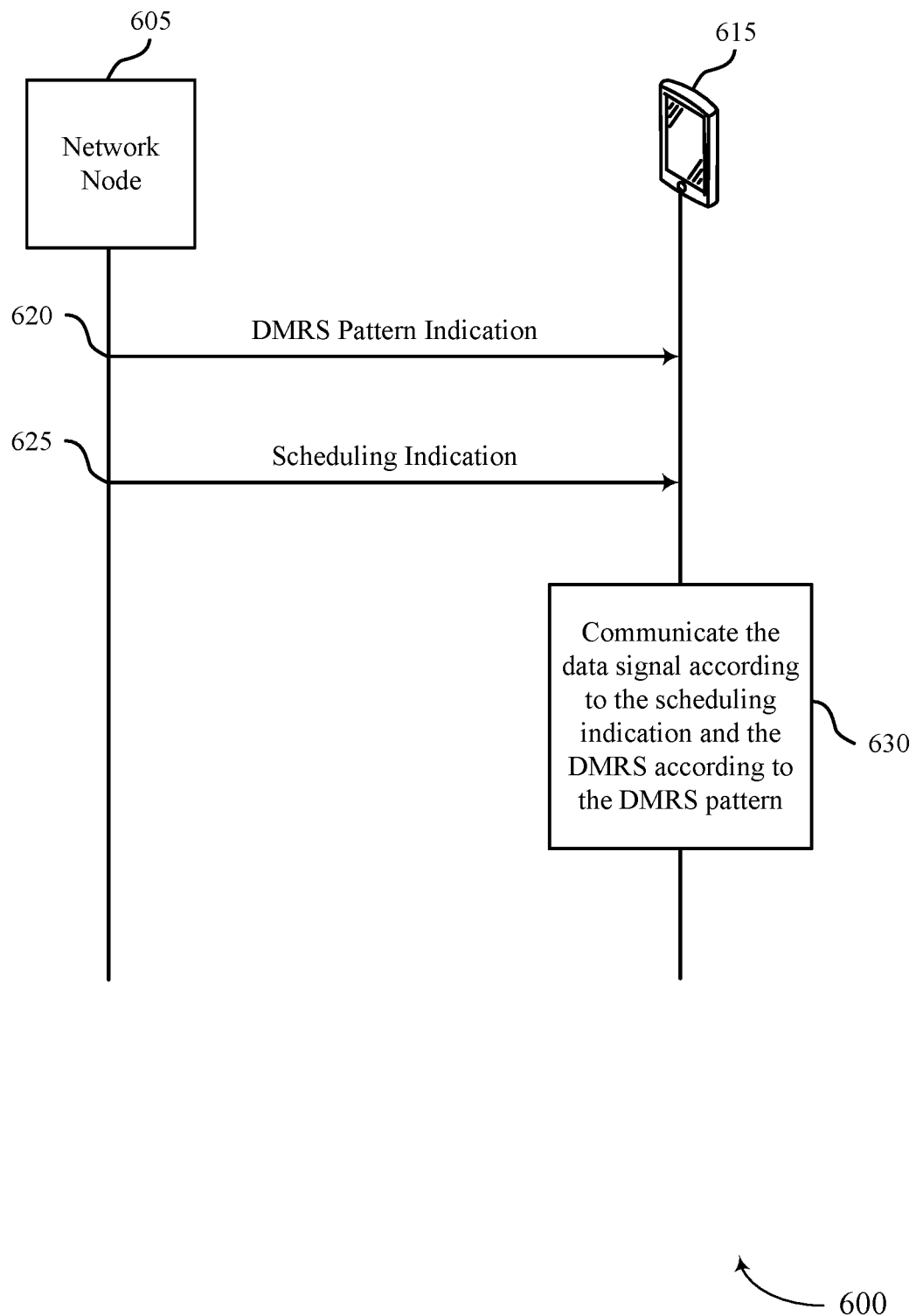
FIG. 6 illustrates an example of a process flow that supports modified DMRS patterns for OFDM in accordance with one or more aspects of the present disclosure.

FIG. 6 illustrates an example of a process flow 600 that supports modified DMRS patterns for OFDM in accordance with one or more aspects of the present disclosure. In some examples, the process flow 600 may implement aspects of the wireless communications system 100, the wireless communications system 200, the resource mappings 300, the resource mappings 400, and the resource mappings 500. For example, the process flow 600 may illustrate operations between a UE 615 a network node 605, which may be examples of the corresponding devices as described with reference to FIGS. 1, 2, 3A, 3B, 4A, 4B, 5A, and 5B. The process flow 600 may be implemented at the UE 615, the network node 605, or both. In the following description of the process flow 600, the information communicated between the UE 615 and the network node 605 may be performed in different orders or at different times than shown. Additionally, or alternatively, some operations may be omitted from the process flow 600 and other operations may be added to the process flow 600.

The UE 615 and the network node 605 may support a framework for transmitting a DMRS with guard tones. For example, at 620, the UE 615 may receive a DMRS pattern indication (e.g., first control signaling) from the network node 605 identifying a DMRS pattern that may be uniformly distributed in a time domain and a frequency domain. The DMRS pattern may be an example of a DMRS pattern as described with reference to FIGS. 1, 2, 3A, 3B, 4A, 4B, 5A, and 5B. For example, the DMRS pattern may include some resource elements for the DMRS and other resource elements for guard tones. That is, the DMRS pattern may include a first set of resource elements for the DMRS, a second set of resource elements for guard tones that are adjacent to and greater in frequency than the first set of resource elements, and a third set of resource elements for guard tones that are adjacent to and lower in frequency than the first set of resource elements.

At 625, the UE 615 may receive a scheduling indication (e.g., second control signaling) from the network node 605. In some examples, the scheduling indication may be an example of a scheduling indication as described with reference to FIG. 2. For example, the scheduling indication may schedule a data signal to be communicated between the UE 615 and the network node 605 in a set of time-frequency resources.

At 630, the UE 615 may communicate the data signal and the DMRS across the set of time-frequency resources. For example, the UE 615 may communicate (e.g., transmit to network node 605 or receive from the network node 605) the data signal according to the scheduling indication transmitted at 625 and the DMRS according to the DMRS pattern (e.g., indicated using the DMRS pattern indication transmitted at 620). In some examples, communicating the DMRS according to the DMRS pattern may enable frequency shift estimation (e.g., at the UE 115 or the network node 105, or both), while reducing inter-carrier interference, among other possible benefits.

Figure 7:
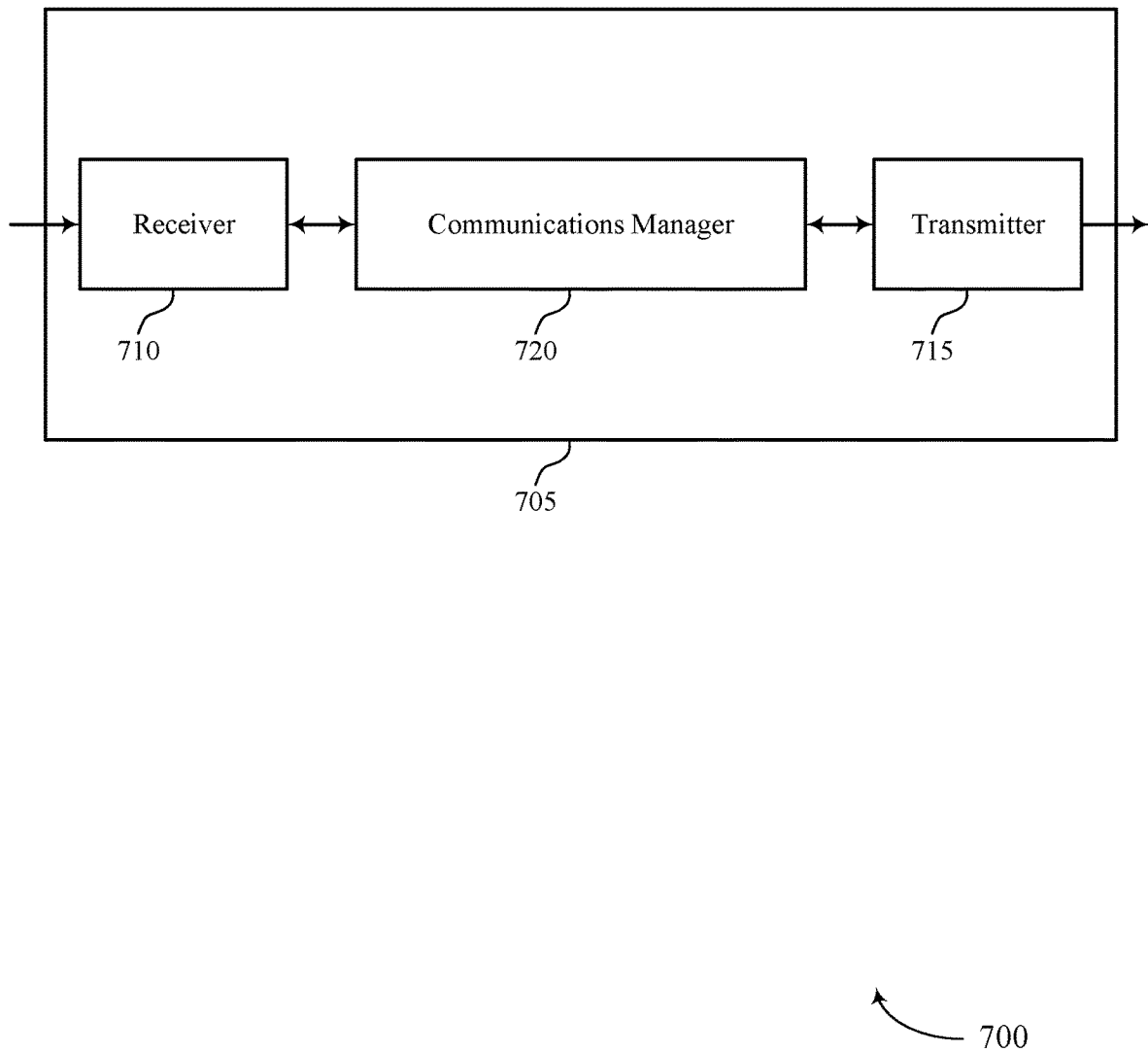
FIGS. 7 and 8 show block diagrams of devices that support modified DMRS patterns for OFDM in accordance with one or more aspects of the present disclosure.

FIG. 7 shows a block diagram 700 of a device 705 that supports modified DMRS patterns for OFDM in accordance with one or more aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the DMRS pattern communication features discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to modified DMRS patterns for OFDM). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to modified DMRS patterns for OFDM). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of modified DMRS patterns for OFDM as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (e.g., the device 705) in accordance with examples as disclosed herein. For example, the communications manager 720 may be configured as or otherwise support a means for receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The communications manager 720 may be configured as or otherwise support a means for receiving second control signaling scheduling a data signal to be communicated between the UE and a network node in a set of time-frequency resources. The communications manager 720 may be configured as or otherwise support a means for communicating, across the set of time-frequency resources, the data signal according to the second control signaling and the DMRS according to the DMRS pattern.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
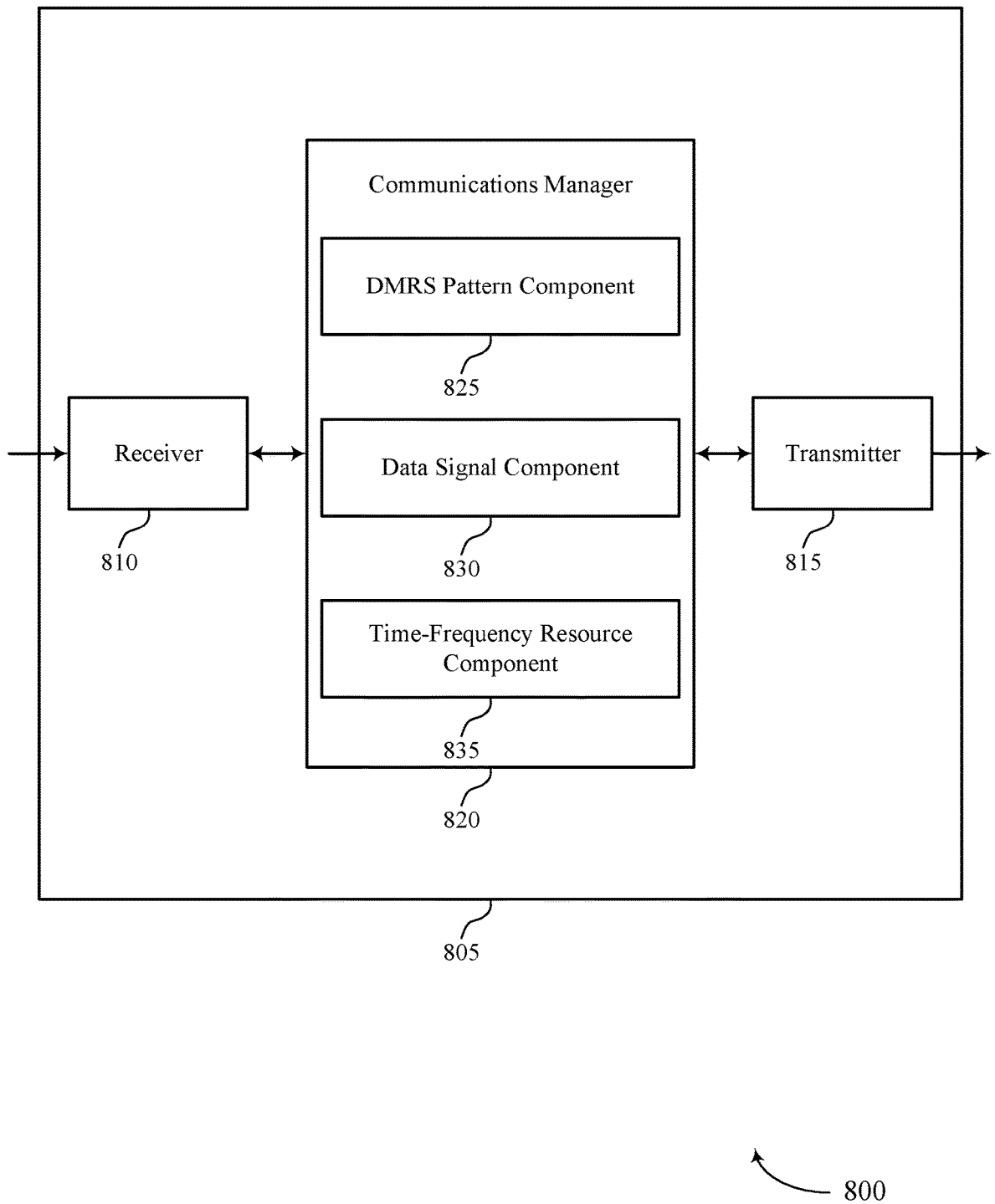

FIG. 8 shows a block diagram 800 of a device 805 that supports modified DMRS patterns for OFDM in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to modified DMRS patterns for OFDM). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to modified DMRS patterns for OFDM). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of modified DMRS patterns for OFDM as described herein. For example, the communications manager 820 may include a DMRS pattern component 825, a data signal component 830, a time-frequency resource component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE (e.g., the device 805) in accordance with examples as disclosed herein. The DMRS pattern component 825 may be configured as or otherwise support a means for receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The data signal component 830 may be configured as or otherwise support a means for receiving second control signaling scheduling a data signal to be communicated between the UE and a network node in a set of time-frequency resources. The time-frequency resource component 835 may be configured as or otherwise support a means for communicating, across the set of time-frequency resources, the data signal according to the second control signaling and the DMRS according to the DMRS pattern.

Figure 9:
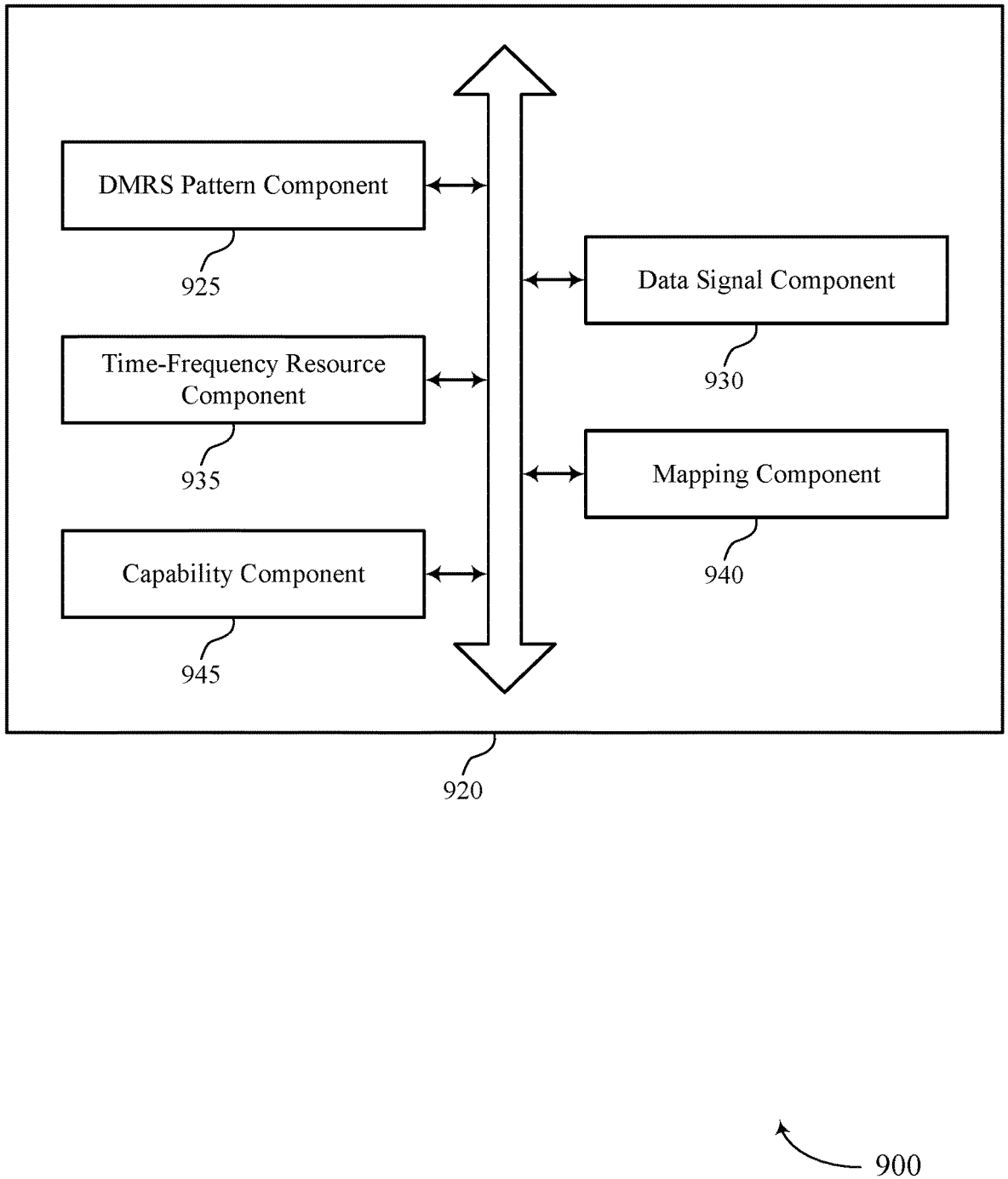
FIG. 9 shows a block diagram of a communications manager that supports modified DMRS patterns for OFDM in accordance with one or more aspects of the present disclosure.

In some cases, the DMRS pattern component 825, the data signal component 830, and the time-frequency resource component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DMRS pattern component 825, the data signal component 830, and the time-frequency resource component 835 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device FIG. 9 shows a block diagram 900 of a communications manager 920 that supports modified DMRS patterns for OFDM in accordance with one or more aspects of the present disclosure. The communications manager 920 may be an example of aspects of a communications manager 720, a communications manager 820, or both, as described herein. The communications manager 920, or various components thereof, may be an example of means for performing various aspects of modified DMRS patterns for OFDM as described herein. For example, the communications manager 920 may include a DMRS pattern component 925, a data signal component 930, a time-frequency resource component 935, a mapping component 940, a capability component 945, or any combination thereof. Each of these components may communicate, directly or indirectly, with one another (e.g., via one or more buses).

The communications manager 920 may support wireless communication at a UE in accordance with examples as disclosed herein. The DMRS pattern component 925 may be configured as or otherwise support a means for receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The data signal component 930 may be configured as or otherwise support a means for receiving second control signaling scheduling a data signal to be communicated between the UE and a network node in a set of time-frequency resources. The time-frequency resource component 935 may be configured as or otherwise support a means for communicating, across the set of time-frequency resources, the data signal according to the second control signaling and the DMRS according to the DMRS pattern.

In some examples, to support communicating the data signal and the DMRS, the mapping component 940 may be configured as or otherwise support a means for mapping the DMRS to the second set of one or more resource elements for the guard tones. In some examples, to support communicating the data signal and the DMRS, the mapping component 940 may be configured as or otherwise support a means for mapping the DMRS to the third set of one or more resource elements for the guard tones.

In some examples, to support communicating the data signal and the DMRS, the mapping component 940 may be configured as or otherwise support a means for mapping a zero-power signal to the second set of one or more resource elements for the guard tones. In some examples, to support communicating the data signal and the DMRS, the mapping component 940 may be configured as or otherwise support a means for mapping the zero-power signal to the third set of one or more resource elements for the guard tones.

In some examples, the first set of one or more resource elements for the DMRS includes a set of multiple adjacent resource elements in the time domain, the frequency domain, or both, that form a block of resource elements. In some examples, the first set of one or more resource elements for the DMRS includes a set of multiple blocks of resource element uniformly distributed in the time domain, each block of the set of multiple blocks including a set of multiple resource elements uniformly distributed in the time domain, the frequency domain, or both. In some examples, a first spacing in the time domain for the set of multiple blocks of resource elements is different from a second spacing in the time domain for the set of multiple resource elements.

In some examples, the capability component 945 may be configured as or otherwise support a means for transmitting an indication of a capability of the UE to communicate DMRSs using adjacent resource elements in the time domain, the frequency domain, or both, where the DMRS pattern is based on the capability.

In some examples, to support receiving the first control signaling identifying the DMRS pattern, the DMRS pattern component 925 may be configured as or otherwise support a means for receiving an indication of a MCS, a subcarrier spacing, or both, to be used for wireless communications at the UE, where the DMRS pattern is identified based on the MCS, the subcarrier spacing, or both. In some examples, the DMRS pattern is identified based on a ratio between a Doppler frequency associated with the wireless communications at the UE and the subcarrier spacing.

In some examples, to support receiving the first control signaling identifying the DMRS pattern, the DMRS pattern component 925 may be configured as or otherwise support a means for receiving an indication of a DMRS configuration identifying the DMRS pattern.

In some examples, to support communicating the data signal and the DMRS, the time-frequency resource component 935 may be configured as or otherwise support a means for transmitting, across the set of time-frequency resources, the data signal according to the second control signaling and the DMRS according to the DMRS pattern.

In some examples, to support communicating the data signal and the DMRS, the time-frequency resource component 935 may be configured as or otherwise support a means for receiving, across the set of time-frequency resources, the data signal according to the second control signaling and the DMRS according to the DMRS pattern. In some examples, the data signal includes an uplink shared channel signal, a downlink shared channel signal, an uplink control channel signal, or a downlink control channel signal.

In some cases, the DMRS pattern component 925, the data signal component 930, the time-frequency resource component 935, the mapping component 940, and the capability component 945 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DMRS pattern component 925, the data signal component 930, the time-frequency resource component 935, the mapping component 940, and the capability component 945 discussed herein.

Figure 10:
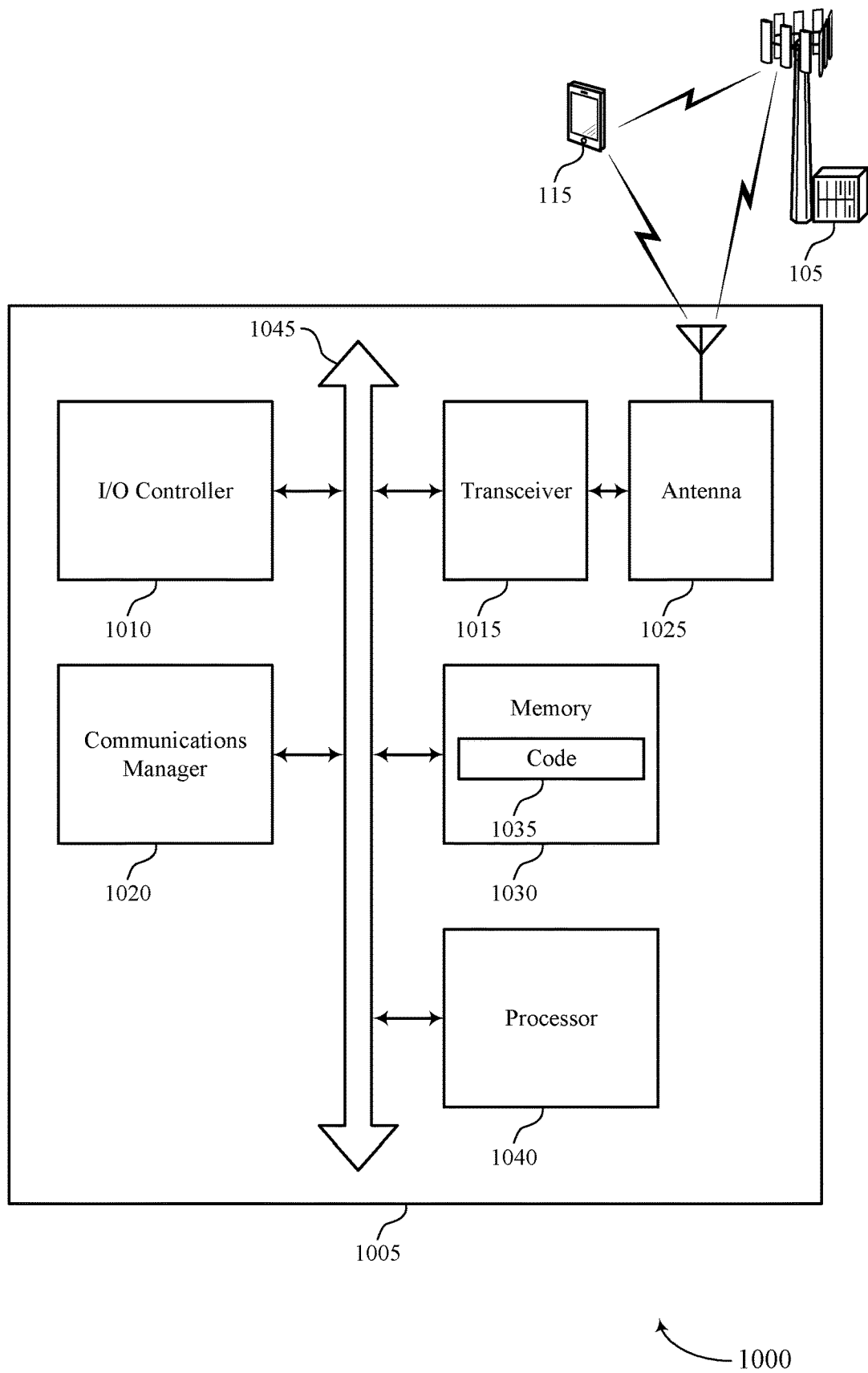
FIG. 10 shows a diagram of a system including a device that supports modified DMRS patterns for OFDM in accordance with one or more aspects of the present disclosure.

FIG. 10 shows a diagram of a system 1000 including a device 1005 that supports modified DMRS patterns for OFDM in accordance with one or more aspects of the present disclosure. The device 1005 may be an example of or include the components of a device 705, a device 805, or a UE 115 as described herein. The device 1005 may communicate (e.g., wirelessly) with one or more network nodes 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting modified DMRS patterns for OFDM). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE (e.g., the device 1005) in accordance with examples as disclosed herein. For example, the communications manager 1020 may be configured as or otherwise support a means for receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The communications manager 1020 may be configured as or otherwise support a means for receiving second control signaling scheduling a data signal to be communicated between the UE and a network node in a set of time-frequency resources. The communications manager 1020 may be configured as or otherwise support a means for communicating, across the set of time-frequency resources, the data signal according to the second control signaling and the DMRS according to the DMRS pattern.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of modified DMRS patterns for OFDM as described herein, or the processor 1040 and the memory 1030 may be otherwise configured to perform or support such operations.

Figure 11:
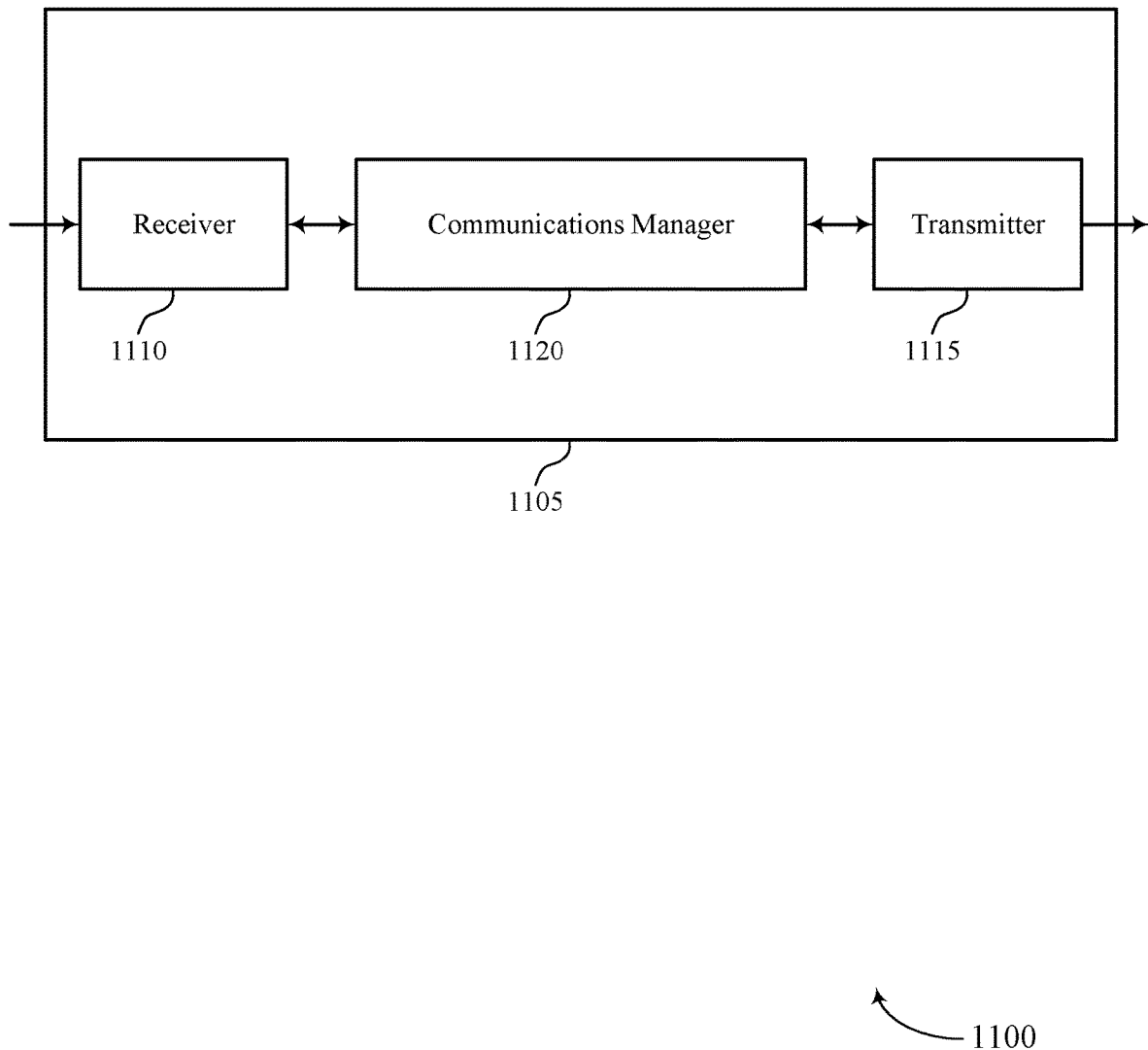
FIGS. 11 and 12 show block diagrams of devices that support modified DMRS patterns for OFDM in accordance with one or more aspects of the present disclosure.

FIG. 11 shows a block diagram 1100 of a device 1105 that supports modified DMRS patterns for OFDM in accordance with one or more aspects of the present disclosure. The device 1105 may be an example of aspects of a network node 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the DMRS pattern communication features discussed herein. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of modified DMRS patterns for OFDM as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network node (e.g., the device 1105) in accordance with examples as disclosed herein. For example, the communications manager 1120 may be configured as or otherwise support a means for outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The communications manager 1120 may be configured as or otherwise support a means for outputting second control signaling scheduling a data signal to be communicated between a UE and the network node in a set of time-frequency resources. The communications manager 1120 may be configured as or otherwise support a means for communicating, across the set of time-frequency resources, the data signal according to the second control signaling and the DMRS according to the DMRS pattern.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
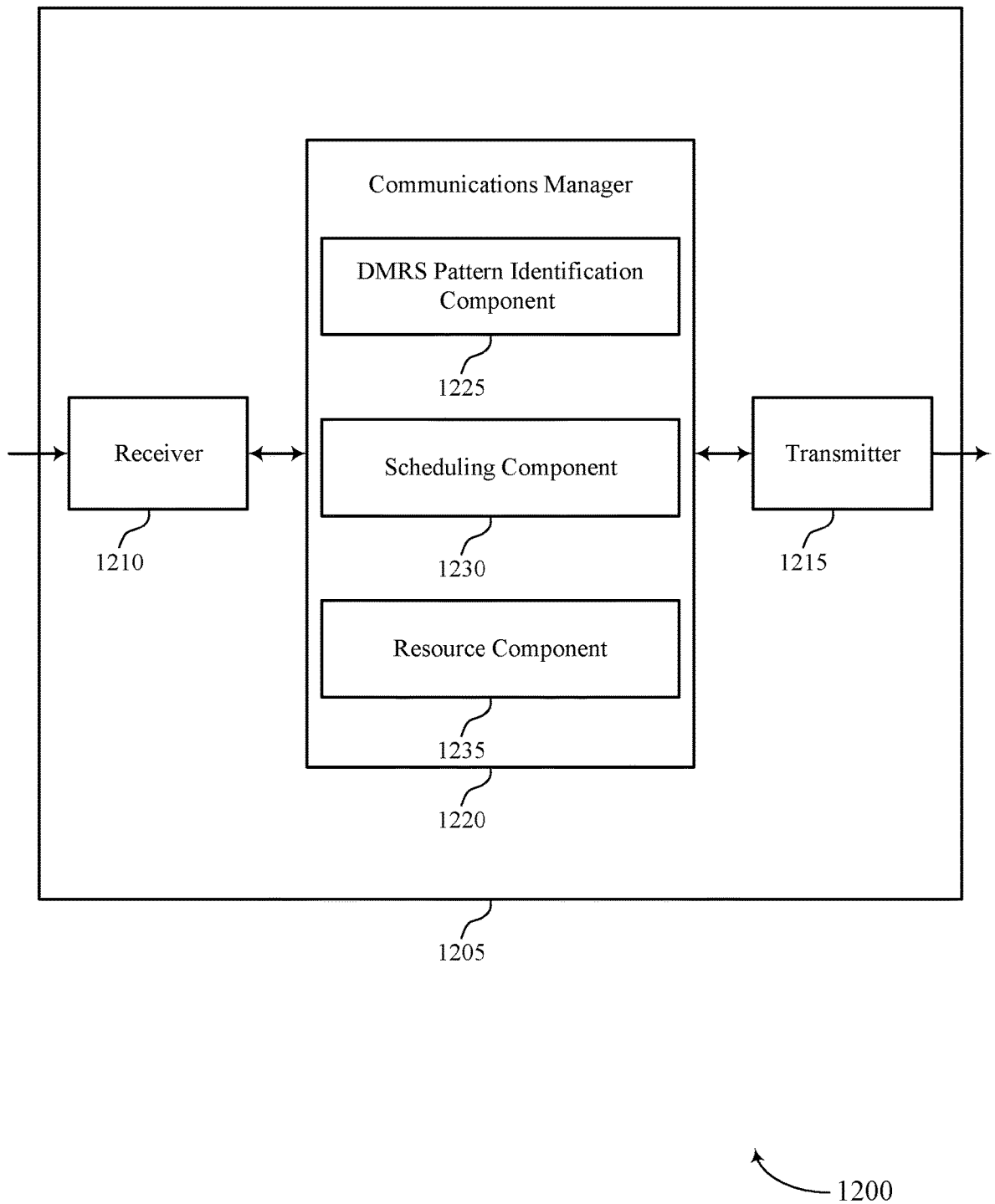

FIG. 12 shows a block diagram 1200 of a device 1205 that supports modified DMRS patterns for OFDM in accordance with one or more aspects of the present disclosure. The device 1205 may be an example of aspects of a device 1105 or a network node 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of modified DMRS patterns for OFDM as described herein. For example, the communications manager 1220 may include a DMRS pattern identification component 1225, a scheduling component 1230, a resource component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network node (e.g., the device 1205) in accordance with examples as disclosed herein. The DMRS pattern identification component 1225 may be configured as or otherwise support a means for outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The scheduling component 1230 may be configured as or otherwise support a means for outputting second control signaling scheduling a data signal to be communicated between a UE and the network node in a set of time-frequency resources. The resource component 1235 may be configured as or otherwise support a means for communicating, across the set of time-frequency resources, the data signal according to the second control signaling and the DMRS according to the DMRS pattern.

In some cases, the DMRS pattern identification component 1225, the scheduling component 1230, and the resource component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DMRS pattern identification component 1225, the scheduling component 1230, and the resource component 1235 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
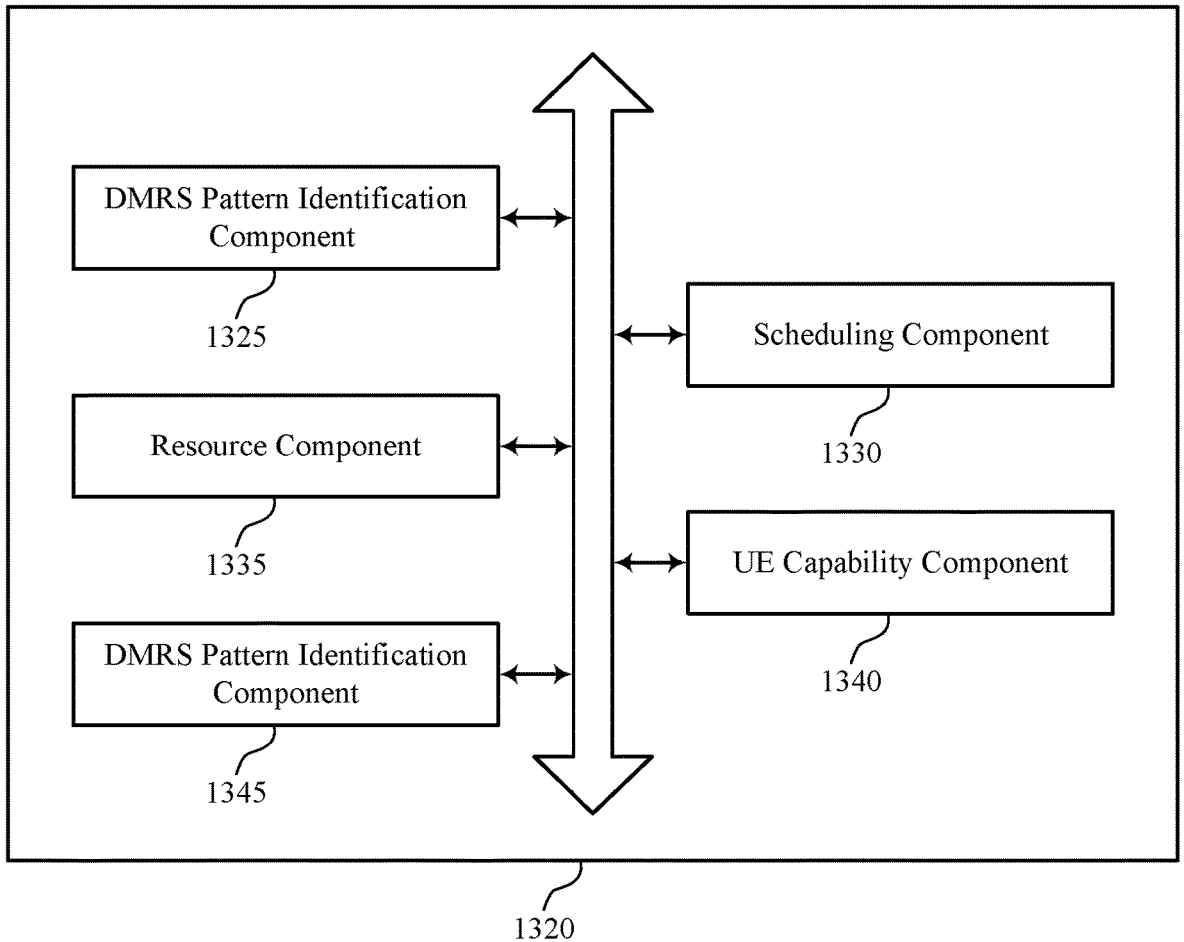
FIG. 13 show block diagrams of devices that support modified DMRS patterns for OFDM in accordance with one or more aspects of the present disclosure.

FIG. 13 shows a block diagram 1300 of a communications manager 1320 that supports modified DMRS patterns for OFDM in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of modified DMRS patterns for OFDM as described herein. For example, the communications manager 1320 may include a DMRS pattern identification component 1325, a scheduling component 1330, a resource component 1335, a UE capability component 1340, a DMRS pattern identification component 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1320 may support wireless communication at a network node in accordance with examples as disclosed herein. The DMRS pattern identification component 1325 may be configured as or otherwise support a means for outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The scheduling component 1330 may be configured as or otherwise support a means for outputting second control signaling scheduling a data signal to be communicated between a UE and the network node in a set of time-frequency resources. The resource component 1335 may be configured as or otherwise support a means for communicating, across the set of time-frequency resources, the data signal according to the second control signaling and the DMRS according to the DMRS pattern.

In some examples, to support communicating the data signal and the DMRS, the resource component 1335 may be configured as or otherwise support a means for mapping the DMRS to the second set of one or more resource elements for the guard tones. In some examples, to support communicating the data signal and the DMRS, the resource component 1335 may be configured as or otherwise support a means for mapping the DMRS to the third set of one or more resource elements for the guard tones.

In some examples, to support communicating the data signal and the DMRS, the resource component 1335 may be configured as or otherwise support a means for mapping a zero-power signal to the second set of one or more resource elements for the guard tones. In some examples, to support communicating the data signal and the DMRS, the resource component 1335 may be configured as or otherwise support a means for mapping the zero-power signal to the third set of one or more resource elements for the guard tones.

In some examples, the first set of one or more resource elements for the DMRS includes a set of multiple adjacent resource elements in the time domain, the frequency domain, or both, that form a block of resource elements. In some examples, the first set of one or more resource elements for the DMRS includes a set of multiple blocks of resource element uniformly distributed in the time domain, each block of the set of multiple blocks including a set of multiple resource elements uniformly distributed in the time domain, the frequency domain, or both. In some examples, a first spacing in the time domain for the set of multiple blocks of resource elements is different from a second spacing in the time domain for the set of multiple resource elements.

In some examples, the UE capability component 1340 may be configured as or otherwise support a means for obtaining an indication of a capability of the UE to communicate DMRSs using adjacent resource elements in the time domain, the frequency domain, or both, where the DMRS pattern is based on the capability.

In some examples, to support outputting the first control signaling identifying the DMRS pattern, the DMRS pattern identification component 1345 may be configured as or otherwise support a means for outputting an indication of a MCS, a subcarrier spacing, or both, to be used for wireless communications at the UE, where the DMRS pattern is identified based on the MCS, the subcarrier spacing, or both.

In some examples, the DMRS pattern is identified based on the MCS and a ratio between a Doppler frequency associated with the wireless communications at the UE and the subcarrier spacing. In some examples, to support outputting the first control signaling identifying the DMRS pattern, the DMRS pattern identification component 1345 may be configured as or otherwise support a means for outputting an indication of a DMRS configuration identifying the DMRS pattern.

In some examples, to support communicating the data signal and the DMRS, the resource component 1335 may be configured as or otherwise support a means for obtaining, across the set of time-frequency resources, the data signal according to the second control signaling and the DMRS according to the DMRS pattern.

In some examples, to support communicating the data signal and the DMRS, the resource component 1335 may be configured as or otherwise support a means for outputting, across the set of time-frequency resources, the data signal according to the second control signaling and the DMRS according to the DMRS pattern. In some examples, the data signal includes an uplink shared channel signal, a downlink shared channel signal, an uplink control channel signal, or a downlink control channel signal.

In some cases, the DMRS pattern identification component 1325, the scheduling component 1330, the resource component 1335, the UE capability component 1340, and the DMRS pattern identification component 1345 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DMRS pattern identification component 1325, the scheduling component 1330, the resource component 1335, the UE capability component 1340, and the DMRS pattern identification component 1345 discussed herein.

Figure 14:
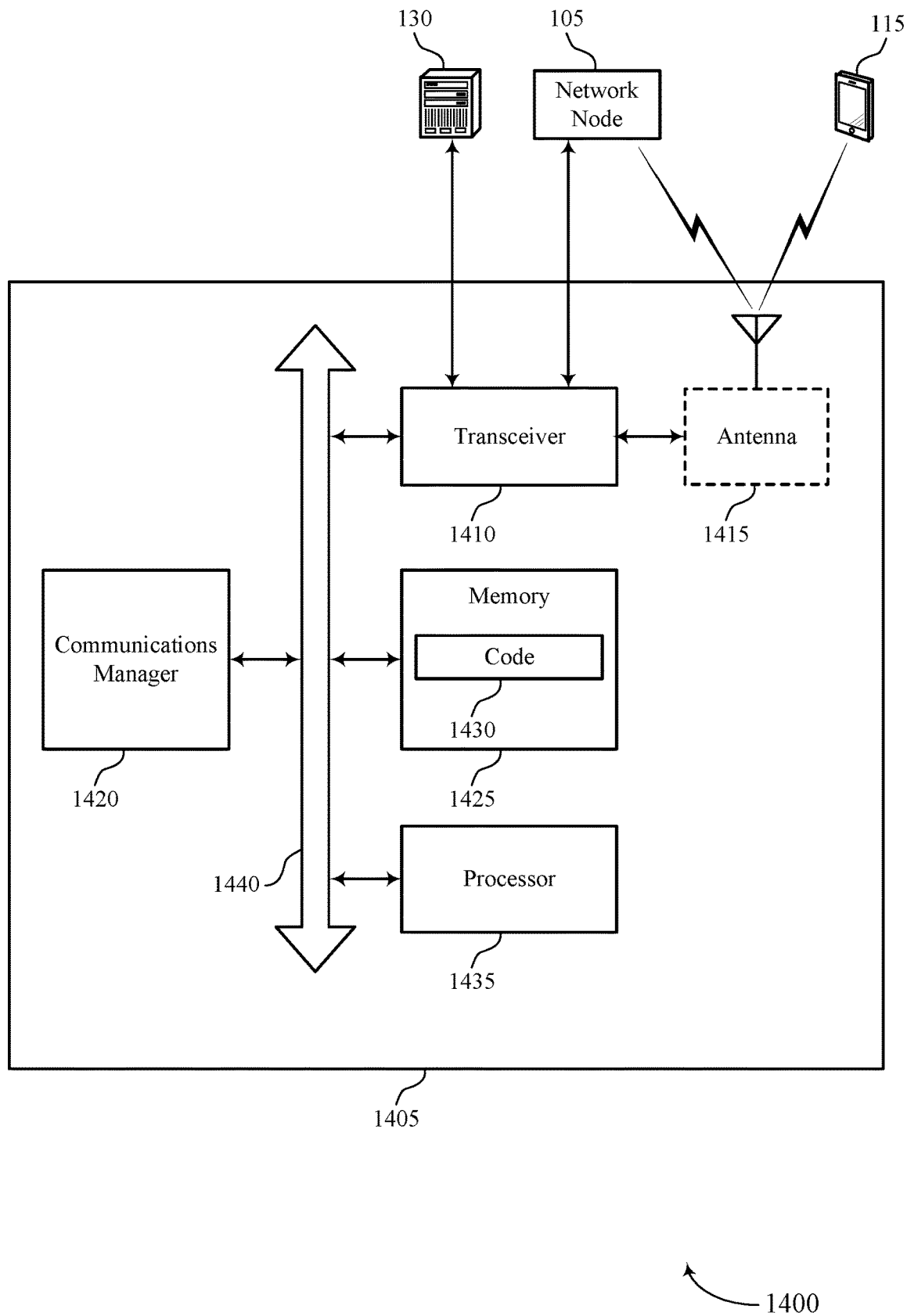
FIG. 14 shows a diagram of a system including a device that supports modified DMRS patterns for OFDM in accordance with one or more aspects of the present disclosure.

FIG. 14 shows a diagram of a system 1400 including a device 1405 that supports modified DMRS patterns for OFDM in accordance with one or more aspects of the present disclosure. The device 1405 may be an example of or include the components of a device 1105, a device 1205, or a network node 105 as described herein. The device 1405 may communicate with one or more network nodes 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting modified DMRS patterns for OFDM). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network nodes 105, and may include a controller or scheduler for controlling communications with UEs 115 in cooperation with other network nodes 105. In some examples, the communications manager 1420 may support an X2 interface within an LTE/LTE-A wireless communications network technology to provide communication between network nodes 105.

The communications manager 1420 may support wireless communication at a network node (e.g., the device 1405) in accordance with examples as disclosed herein. For example, the communications manager 1420 may be configured as or otherwise support a means for outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The communications manager 1420 may be configured as or otherwise support a means for outputting second control signaling scheduling a data signal to be communicated between a UE and the network node in a set of time-frequency resources. The communications manager 1420 may be configured as or otherwise support a means for communicating, across the set of time-frequency resources, the data signal according to the second control signaling and the DMRS according to the DMRS pattern.

By including or configuring the communications manager 1420 in accordance with examples as described herein, the device 1405 may support techniques for improved communication reliability, reduced latency, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of modified DMRS patterns for OFDM as described herein, or the processor 1435 and the memory 1425 may be otherwise configured to perform or support such operations.

Figure 15:
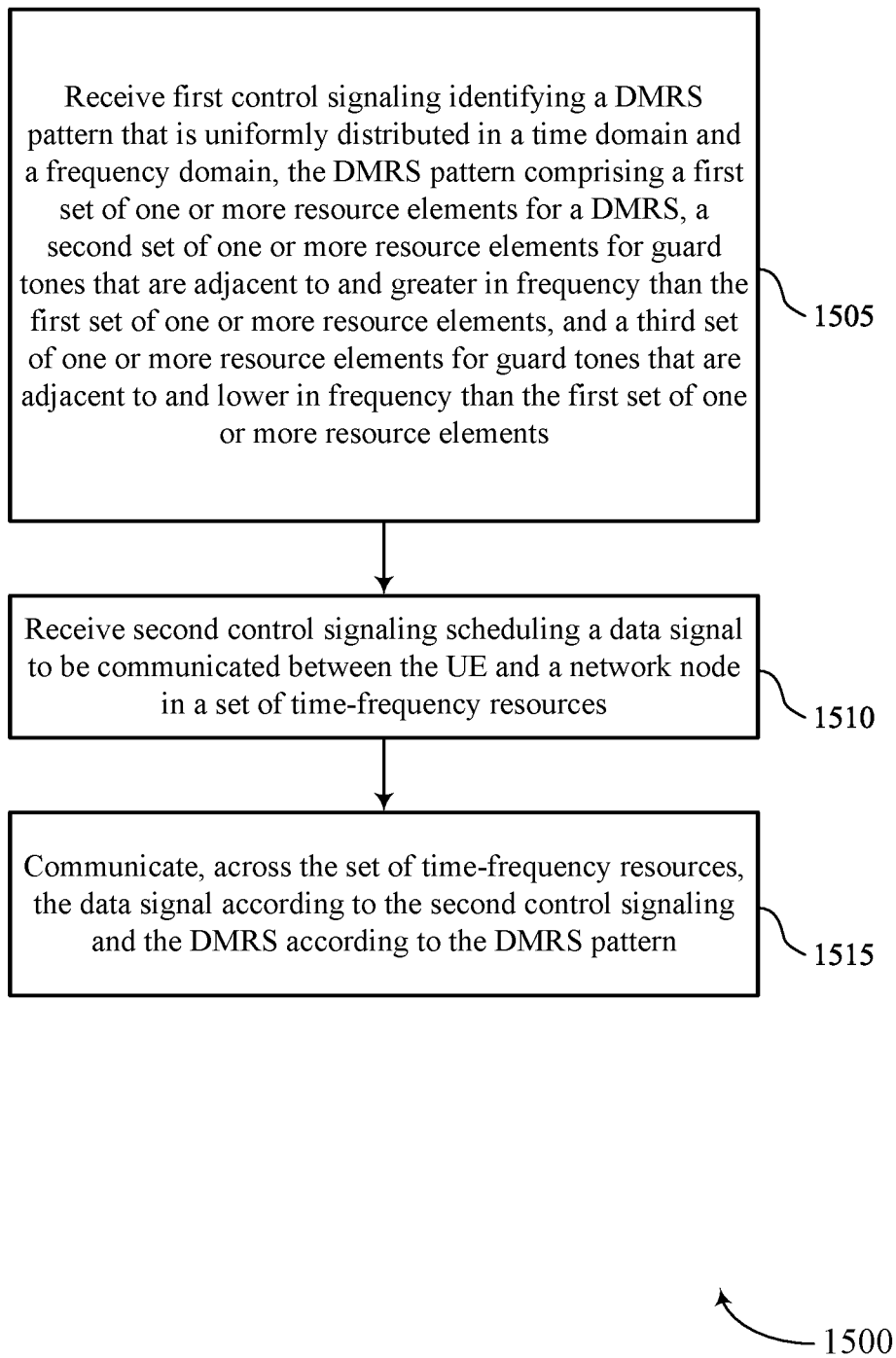
FIGS. 15 through 18 show flowcharts illustrating methods that support modified DMRS patterns for OFDM in accordance with one or more aspects of the present disclosure.

FIG. 15 shows a flowchart illustrating a method 1500 that supports modified DMRS patterns for OFDM in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The operations of 1505 may be performed in accordance with examples as disclosed herein. In some examples, aspects of the operations of 1505 may be performed by a DMRS pattern component 925 as described with reference to FIG. 9.

At 1510, the method may include receiving second control signaling scheduling a data signal to be communicated between the UE and a network node in a set of time-frequency resources. The operations of 1510 may be performed in accordance with examples as disclosed herein. In some examples, aspects of the operations of 1510 may be performed by a data signal component 930 as described with reference to FIG. 9.

At 1515, the method may include communicating, across the set of time-frequency resources, the data signal according to the second control signaling and the DMRS according to the DMRS pattern. The operations of 1515 may be performed in accordance with examples as disclosed herein. In some examples, aspects of the operations of 1515 may be performed by a time-frequency resource component 935 as described with reference to FIG. 9.

Figure 16:
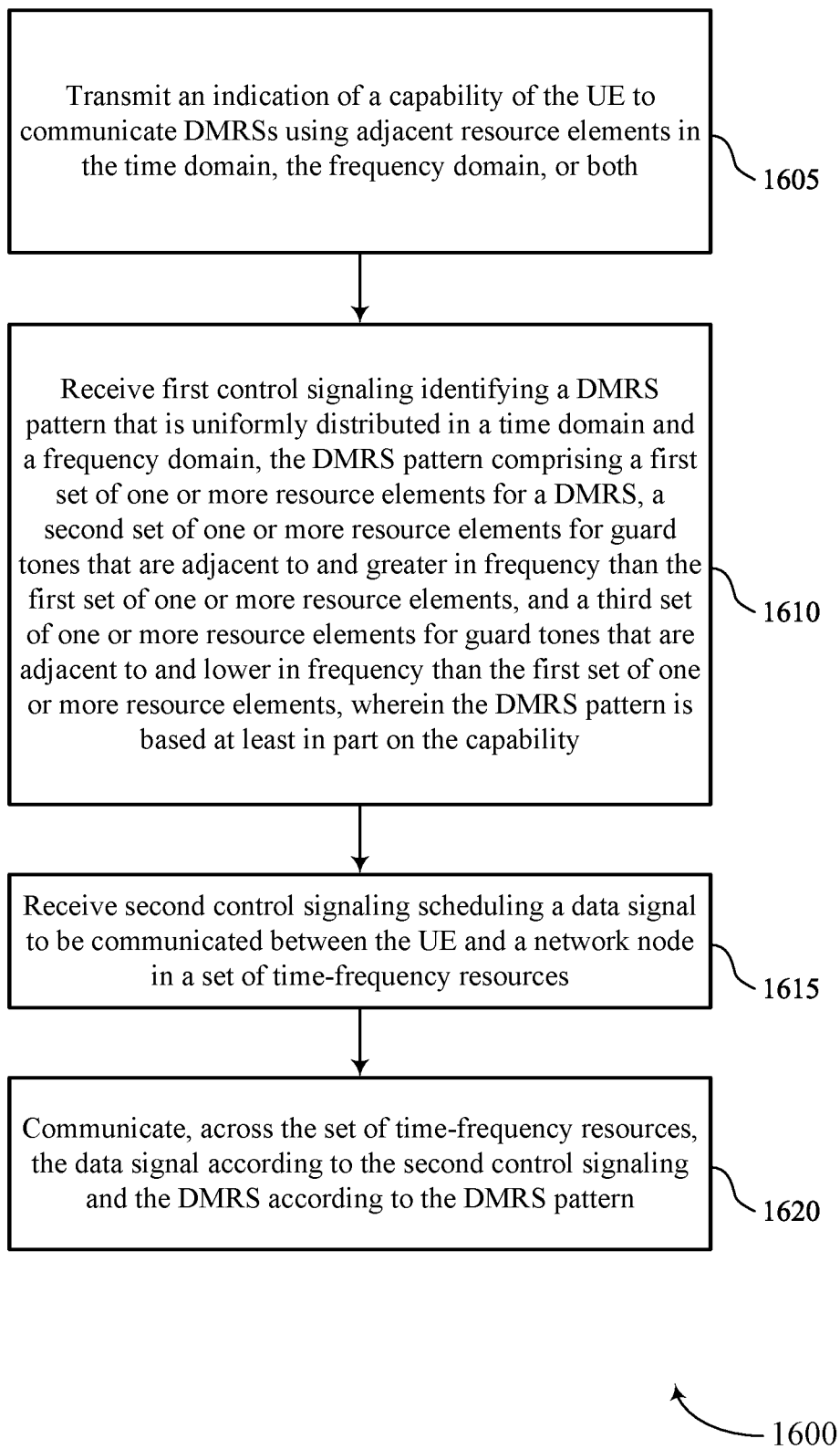

FIG. 16 shows a flowchart illustrating a method 1600 that supports modified DMRS patterns for OFDM in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting an indication of a capability of the UE to communicate DMRSs using adjacent resource elements in the time domain, the frequency domain, or both. The operations of 1605 may be performed in accordance with examples as disclosed herein. In some examples, aspects of the operations of 1605 may be performed by a capability component 945 as described with reference to FIG. 9.

At 1610, the method may include receiving first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, where the DMRS pattern is based on the capability. The operations of 1610 may be performed in accordance with examples as disclosed herein. In some examples, aspects of the operations of 1610 may be performed by a DMRS pattern component 925 as described with reference to FIG. 9.

At 1615, the method may include receiving second control signaling scheduling a data signal to be communicated between the UE and a network node in a set of time-frequency resources. The operations of 1615 may be performed in accordance with examples as disclosed herein. In some examples, aspects of the operations of 1615 may be performed by a data signal component 930 as described with reference to FIG. 9.

At 1620, the method may include communicating, across the set of time-frequency resources, the data signal according to the second control signaling and the DMRS according to the DMRS pattern. The operations of 1620 may be performed in accordance with examples as disclosed herein.

In some examples, aspects of the operations of 1620 may be performed by a time-frequency resource component 935 as described with reference to FIG. 9.

Figure 17:
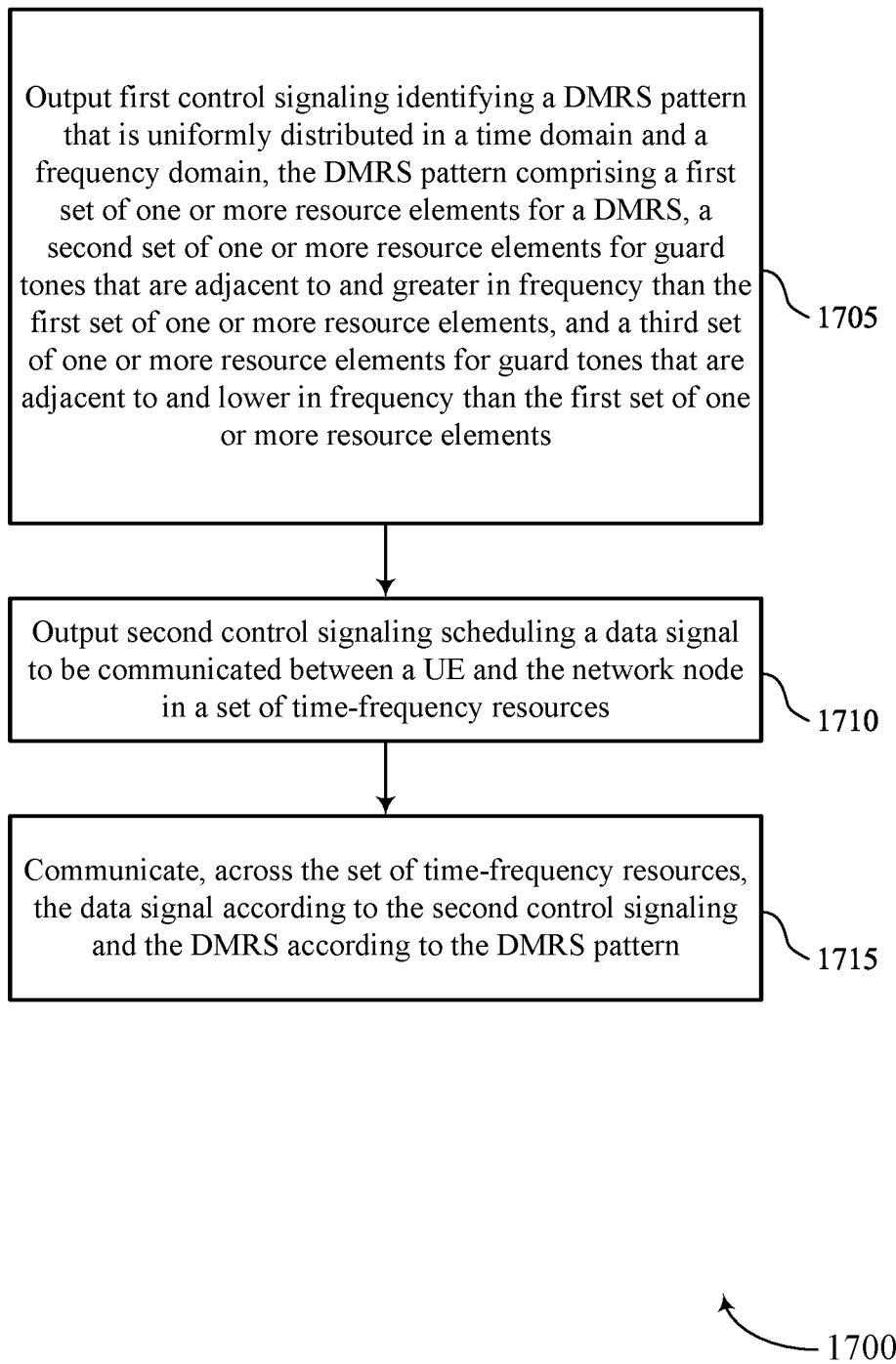

FIG. 17 shows a flowchart illustrating a method 1700 that supports modified DMRS patterns for OFDM in accordance with one or more aspects of the present disclosure. The operations of the method 1700 may be implemented by a network node or its components as described herein. For example, the operations of the method 1700 may be performed by a network node as described with reference to FIGS. 1 through 6 and 11 through 14. In some examples, a network node may execute a set of instructions to control the functional elements of the network node to perform the described functions. Additionally, or alternatively, the network node may perform aspects of the described functions using special-purpose hardware.

At 1705, the method may include outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements. The operations of 1705 may be performed in accordance with examples as disclosed herein. In some examples, aspects of the operations of 1705 may be performed by a DMRS pattern identification component 1325 as described with reference to FIG. 13.

At 1710, the method may include outputting second control signaling scheduling a data signal to be communicated between a UE and the network node in a set of time-frequency resources. The operations of 1710 may be performed in accordance with examples as disclosed herein. In some examples, aspects of the operations of 1710 may be performed by a scheduling component 1330 as described with reference to FIG. 13.

At 1715, the method may include communicating, across the set of time-frequency resources, the data signal according to the second control signaling and the DMRS according to the DMRS pattern. The operations of 1715 may be performed in accordance with examples as disclosed herein. In some examples, aspects of the operations of 1715 may be performed by a resource component 1335 as described with reference to FIG. 13.

Figure 18:
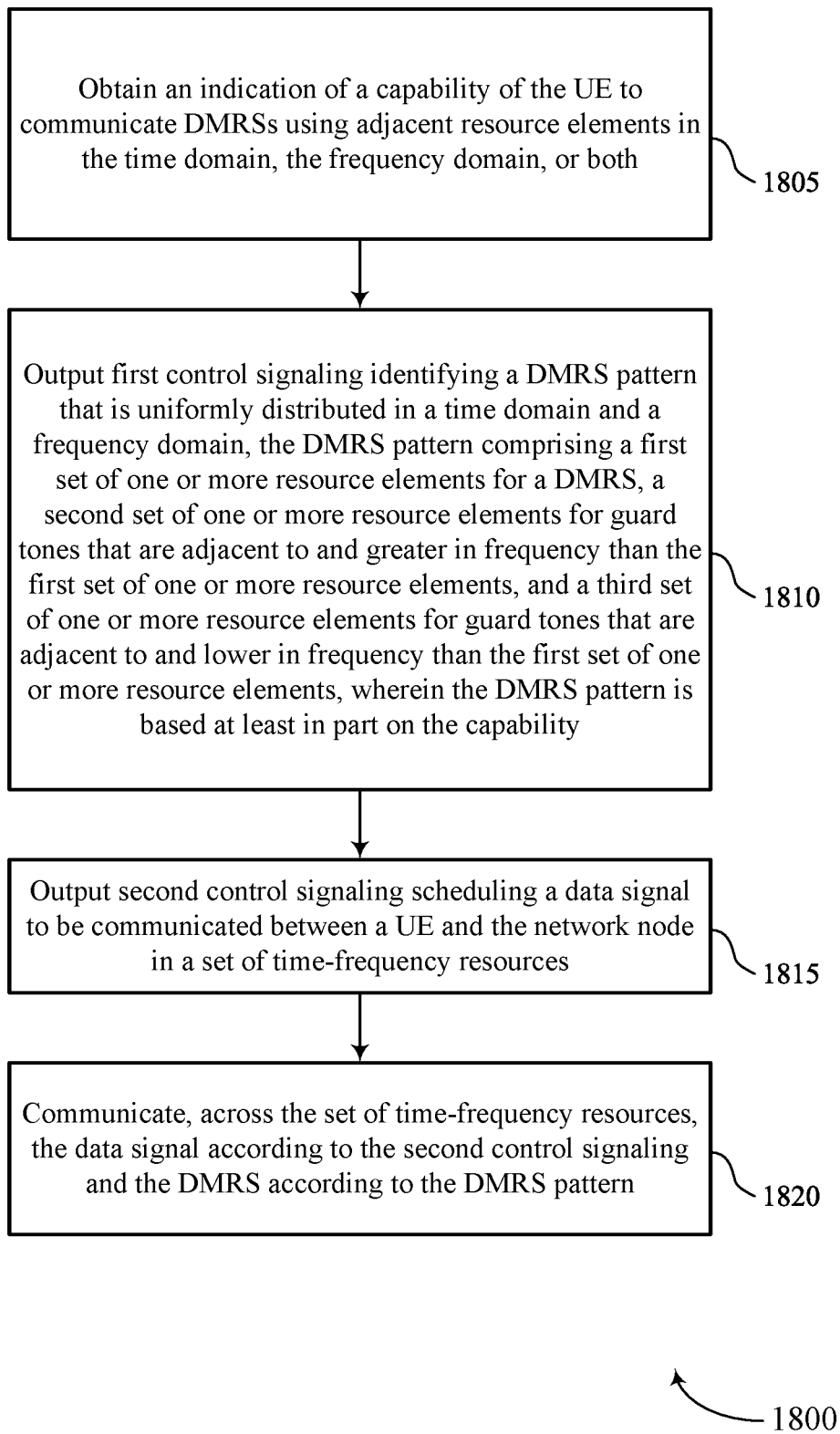

FIG. 18 shows a flowchart illustrating a method 1800 that supports modified DMRS patterns for OFDM in accordance with one or more aspects of the present disclosure. The operations of the method 1800 may be implemented by a network node or its components as described herein. For example, the operations of the method 1800 may be performed by a network node as described with reference to FIGS. 1 through 6 and 11 through 14. In some examples, a network node may execute a set of instructions to control the functional elements of the network node to perform the described functions. Additionally, or alternatively, the network node may perform aspects of the described functions using special-purpose hardware.

At 1805, the method may include obtaining an indication of a capability of the UE to communicate DMRSs using adjacent resource elements in the time domain, the frequency domain, or both. The operations of 1805 may be performed in accordance with examples as disclosed herein. In some examples, aspects of the operations of 1805 may be performed by a UE capability component 1340 as described with reference to FIG. 13.

At 1810, the method may include outputting first control signaling identifying a DMRS pattern that is uniformly distributed in a time domain and a frequency domain, the DMRS pattern including a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements, where the DMRS pattern is based on the capability. The operations of 1810 may be performed in accordance with examples as disclosed herein. In some examples, aspects of the operations of 1810 may be performed by a DMRS pattern identification component 1325 as described with reference to FIG. 13.

At 1815, the method may include outputting second control signaling scheduling a data signal to be communicated between a UE and the network node in a set of time-frequency resources. The operations of 1815 may be performed in accordance with examples as disclosed herein. In some examples, aspects of the operations of 1815 may be performed by a scheduling component 1330 as described with reference to FIG. 13.

At 1820, the method may include communicating, across the set of time-frequency resources, the data signal according to the second control signaling and the DMRS according to the DMRS pattern. The operations of 1820 may be performed in accordance with examples as disclosed herein. In some examples, aspects of the operations of 1820 may be performed by a resource component 1335 as described with reference to FIG. 13.

The following provides an overview of aspects of the present disclosure:

Aspect 1: A method for wireless communication at a UE, comprising: receiving first control signaling identifying a DMRS pattern that is uniformly distributed in a time domain and a frequency domain, the DMRS pattern comprising a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements; receiving second control signaling scheduling a data signal to be communicated between the UE and a network node in a set of time-frequency resources; and communicating, across the set of time-frequency resources, the data signal according to the second control signaling and the DMRS according to the DMRS pattern.

Aspect 2: The method of aspect 1, wherein communicating the data signal and the DMRS further comprises: mapping the DMRS to the second set of one or more resource elements for the guard tones; and mapping the DMRS to the third set of one or more resource elements for the guard tones.

Aspect 3: The method of aspect 1, wherein communicating the data signal and the DMRS further comprises: mapping a zero-power signal to the second set of one or more resource elements for the guard tones; and mapping the zero-power signal to the third set of one or more resource elements for the guard tones.

Aspect 4: The method of any of aspects 1 through 3, wherein the first set of one or more resource elements for the DMRS comprises a plurality of adjacent resource elements in the time domain, the frequency domain, or both, that form a block of resource elements.

Aspect 5: The method of any of aspects 1 through 3, wherein the first set of one or more resource elements for the DMRS comprises a plurality of blocks of resource element uniformly distributed in the time domain, each block of the plurality of blocks comprising a plurality of resource elements uniformly distributed in the time domain, the frequency domain, or both.

Aspect 6: The method of aspect 5, wherein a first spacing in the time domain for the plurality of blocks of resource elements is different from a second spacing in the time domain for the plurality of resource elements.

Aspect 7: The method of any of aspects 1 through 6, further comprising: transmitting an indication of a capability of the UE to communicate DMRSs using adjacent resource elements in the time domain, the frequency domain, or both, wherein the DMRS pattern is based at least in part on the capability.

Aspect 8: The method of any of aspects 1 through 7, wherein receiving the first control signaling identifying the DMRS pattern comprises: receiving an indication of a MCS, a subcarrier spacing, or both, to be used for wireless communications at the UE, wherein the DMRS pattern is identified based at least in part on the MCS, the subcarrier spacing, or both.

Aspect 9: The method of aspect 8, wherein the DMRS pattern is identified based at least in part on a ratio between a Doppler frequency associated with the wireless communications at the UE and the subcarrier spacing.

Aspect 10: The method of any of aspects 1 through 7, wherein receiving the first control signaling identifying the DMRS pattern comprises: receiving an indication of a DMRS configuration identifying the DMRS pattern.

Aspect 11: The method of any of aspects 1 through 10, wherein communicating the data signal and the DMRS comprises: transmitting, across the set of time-frequency resources, the data signal according to the second control signaling and the DMRS according to the DMRS pattern.

Aspect 12: The method of any of aspects 1 through 10, wherein communicating the data signal and the DMRS comprises: receiving, across the set of time-frequency resources, the data signal according to the second control signaling and the DMRS according to the DMRS pattern.

Aspect 13: The method of any of aspects 1 through 12, wherein the data signal comprises an uplink shared channel signal, a downlink shared channel signal, an uplink control channel signal, or a downlink control channel signal.

Aspect 14: A method for wireless communication at a network node, comprising: outputting first control signaling identifying a DMRS pattern that is uniformly distributed in a time domain and a frequency domain, the DMRS pattern comprising a first set of one or more resource elements for a DMRS, a second set of one or more resource elements for guard tones that are adjacent to and greater in frequency than the first set of one or more resource elements, and a third set of one or more resource elements for guard tones that are adjacent to and lower in frequency than the first set of one or more resource elements; outputting second control signaling scheduling a data signal to be communicated between a UE and the network node in a set of time-frequency resources; and communicating, across the set of time-frequency resources, the data signal according to the second control signaling and the DMRS according to the DMRS pattern.

Aspect 15: The method of aspect 14, wherein communicating the data signal and the DMRS further comprises: mapping the DMRS to the second set of one or more resource elements for the guard tones; and mapping the DMRS to the third set of one or more resource elements for the guard tones.

Aspect 16: The method of aspect 14, wherein communicating the data signal and the DMRS further comprises: mapping a zero-power signal to the second set of one or more resource elements for the guard tones; and mapping the zero-power signal to the third set of one or more resource elements for the guard tones.

Aspect 17: The method of any of aspects 14 through 16, wherein the first set of one or more resource elements for the DMRS comprises a plurality of adjacent resource elements in the time domain, the frequency domain, or both, that form a block of resource elements.

Aspect 18: The method of any of aspects 14 through 16, wherein the first set of one or more resource elements for the DMRS comprises a plurality of blocks of resource element uniformly distributed in the time domain, each block of the plurality of blocks comprising a plurality of resource elements uniformly distributed in the time domain, the frequency domain, or both.

Aspect 19: The method of aspect 18, wherein a first spacing in the time domain for the plurality of blocks of resource elements is different from a second spacing in the time domain for the plurality of resource elements.

Aspect 20: The method of any of aspects 14 through 19, further comprising: obtaining an indication of a capability of the UE to communicate DMRSs using adjacent resource elements in the time domain, the frequency domain, or both, wherein the DMRS pattern is based at least in part on the capability.

Aspect 21: The method of any of aspects 14 through 20, wherein outputting the first control signaling identifying the DMRS pattern comprises: outputting an indication of a MCS, a subcarrier spacing, or both, to be used for wireless communications at the UE, wherein the DMRS pattern is identified based at least in part on the MCS, the subcarrier spacing, or both.

Aspect 22: The method of aspect 21, wherein the DMRS pattern is identified based at least in part on the MCS and a ratio between a Doppler frequency associated with the wireless communications at the UE and the subcarrier spacing.

Aspect 23: The method of any of aspects 14 through 20, wherein outputting the first control signaling identifying the DMRS pattern comprises: outputting an indication of a DMRS configuration identifying the DMRS pattern.

Aspect 24: The method of any of aspects 14 through 23, wherein communicating the data signal and the DMRS comprises: obtaining, across the set of time-frequency resources, the data signal according to the second control signaling and the DMRS according to the DMRS pattern.

Aspect 25: The method of any of aspects 14 through 23, wherein communicating the data signal and the DMRS comprises: outputting, across the set of time-frequency resources, the data signal according to the second control signaling and the DMRS according to the DMRS pattern.

Aspect 26: The method of any of aspects 14 through 25, wherein the data signal comprises an uplink shared channel signal, a downlink shared channel signal, an uplink control channel signal, or a downlink control channel signal.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network node, comprising a processor; memory coupled with the processor; and instructions stored in the memory and executable by the processor to cause the apparatus to perform a method of any of aspects 14 through 26.

Aspect 31: An apparatus for wireless communication at a network node, comprising at least one means for performing a method of any of aspects 14 through 26.

Aspect 32: A non-transitory computer-readable medium storing code for wireless communication at a network node, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive first control signaling identifying a demodulation reference signal pattern that is uniformly distributed in a time domain and a frequency domain, the demodulation reference signal pattern comprising a first set of one or more resource elements for a demodulation reference signal, a second set of one or more resource elements for guard tones that are adjacent to and greater in frequency than the first set of one or more resource elements, and a third set of one or more resource elements for guard tones that are adjacent to and lower in frequency than the first set of one or more resource elements;
      receive second control signaling scheduling a data signal to be communicated between the UE and a network node in a set of time-frequency resources; and
      communicate, across the set of time-frequency resources, the data signal according to the second control signaling and the demodulation reference signal according to the demodulation reference signal pattern.

2. The apparatus of claim 1, wherein the instructions are further executable by the processor to communicate the data signal and the demodulation reference signal by being executable by the processor to:
   map the demodulation reference signal to the second set of one or more resource elements for the guard tones; and
   map the demodulation reference signal to the third set of one or more resource elements for the guard tones.

3. The apparatus of claim 1, wherein the instructions are further executable by the processor to communicate the data signal and the demodulation reference signal by being executable by the processor to:
   map a zero-power signal to the second set of one or more resource elements for the guard tones; and
   map the zero-power signal to the third set of one or more resource elements for the guard tones.

4. The apparatus of claim 1, wherein the first set of one or more resource elements for the demodulation reference signal comprises a plurality of adjacent resource elements in the time domain, the frequency domain, or both, that form a block of resource elements.

5. The apparatus of claim 1, wherein the first set of one or more resource elements for the demodulation reference signal comprises a plurality of blocks of resource element uniformly distributed in the time domain, each block of the plurality of blocks comprising a plurality of resource elements uniformly distributed in the time domain, the frequency domain, or both.

6. The apparatus of claim 5, wherein a first spacing in the time domain for the plurality of blocks of resource elements is different from a second spacing in the time domain for the plurality of resource elements.

7. The apparatus of claim 1, wherein the instructions are further executable by the processor to:
   transmit an indication of a capability of the UE to communicate demodulation reference signals using adjacent resource elements in the time domain, the frequency domain, or both, wherein the demodulation reference signal pattern is based at least in part on the capability.

8. The apparatus of claim 1, wherein the instructions are further executable by the processor to receive the first control signaling identifying the demodulation reference signal pattern by being executable by the processor to:
   receive an indication of a modulation and coding scheme, a subcarrier spacing, or both, to be used for wireless communications at the UE, wherein the demodulation reference signal pattern is identified based at least in part on the modulation and coding scheme, the subcarrier spacing, or both.

9. The apparatus of claim 8, wherein the demodulation reference signal pattern is identified based at least in part on a ratio between a Doppler frequency associated with the wireless communications at the UE and the subcarrier spacing.

10. The apparatus of claim 1, wherein the instructions are further executable by the processor to receive the first control signaling identifying the demodulation reference signal pattern by being executable by the processor to:
   receive an indication of a demodulation reference signal configuration identifying the demodulation reference signal pattern.

11. The apparatus of claim 1, wherein the instructions are further executable by the processor to communicate the data signal and the demodulation reference signal by being executable by the processor to:
   transmit, across the set of time-frequency resources, the data signal according to the second control signaling and the demodulation reference signal according to the demodulation reference signal pattern.

12. The apparatus of claim 1, wherein the instructions are further executable by the processor to communicate the data signal and the demodulation reference signal by being executable by the processor to:
   receive, across the set of time-frequency resources, the data signal according to the second control signaling and the demodulation reference signal according to the demodulation reference signal pattern.

13. The apparatus of claim 1, wherein the data signal comprises an uplink shared channel signal, a downlink shared channel signal, an uplink control channel signal, or a downlink control channel signal.

14. An apparatus for wireless communication at a network node, comprising:
a processor;
memory coupled with the processor; and
instructions stored in the memory and executable by the processor to cause the apparatus to:
output first control signaling identifying a demodulation reference signal pattern that is uniformly distributed in a time domain and a frequency domain, the demodulation reference signal pattern comprising a first set of one or more resource elements for a demodulation reference signal, a second set of one or more resource elements for guard tones that are adjacent to and greater in frequency than the first set of one or more resource elements, and a third set of one or more resource elements for guard tones that are adjacent to and lower in frequency than the first set of one or more resource elements;
output second control signaling scheduling a data signal to be communicated between a user equipment (UE) and the network node in a set of time-frequency resources; and
communicate, across the set of time-frequency resources, the data signal according to the second control signaling and the demodulation reference signal according to the demodulation reference signal pattern.

15. The apparatus of claim 14, wherein the instructions are further executable by the processor to communicate the data signal and the demodulation reference signal by being executable by the processor to:
map the demodulation reference signal to the second set of one or more resource elements for the guard tones; and
map the demodulation reference signal to the third set of one or more resource elements for the guard tones.

16. The apparatus of claim 14, wherein the instructions are further executable by the processor to communicate the data signal and the demodulation reference signal by being executable by the processor to:
map a zero-power signal to the second set of one or more resource elements for the guard tones; and
map the zero-power signal to the third set of one or more resource elements for the guard tones.

17. The apparatus of claim 14, wherein the first set of one or more resource elements for the demodulation reference signal comprises a plurality of adjacent resource elements in the time domain, the frequency domain, or both, that form a block of resource elements.

18. The apparatus of claim 14, wherein the first set of one or more resource elements for the demodulation reference signal comprises a plurality of blocks of resource element uniformly distributed in the time domain, each block of the plurality of blocks comprising a plurality of resource elements uniformly distributed in the time domain, the frequency domain, or both.

19. The apparatus of claim 18, wherein a first spacing in the time domain for the plurality of blocks of resource elements is different from a second spacing in the time domain for the plurality of resource elements.

20. The apparatus of claim 14, wherein the instructions are further executable by the processor to:
obtain an indication of a capability of the UE to communicate demodulation reference signals using adjacent resource elements in the time domain, the frequency domain, or both, wherein the demodulation reference signal pattern is based at least in part on the capability.

21. The apparatus of claim 14, wherein the instructions are further executable by the processor to output the first control signaling identifying the demodulation reference signal pattern by being executable by the processor to:
output an indication of a modulation and coding scheme, a subcarrier spacing, or both, to be used for wireless communications at the UE, wherein the demodulation reference signal pattern is identified based at least in part on the modulation and coding scheme, the subcarrier spacing, or both.

22. The apparatus of claim 21, wherein the demodulation reference signal pattern is identified based at least in part on the modulation and coding scheme and a ratio between a Doppler frequency associated with the wireless communications at the UE and the subcarrier spacing.

23. The apparatus of claim 14, wherein the instructions are further executable by the processor to output the first control signaling identifying the demodulation reference signal pattern by being executable by the processor to:
output an indication of a demodulation reference signal configuration identifying the demodulation reference signal pattern.

24. The apparatus of claim 14, wherein the instructions are further executable by the processor to communicate the data signal and the demodulation reference signal by being executable by the processor to:
obtain, across the set of time-frequency resources, the data signal according to the second control signaling and the demodulation reference signal according to the demodulation reference signal pattern.

25. The apparatus of claim 14, wherein the instructions are further executable by the processor to communicate the data signal and the demodulation reference signal by being executable by the processor to:
outputting, across the set of time-frequency resources, the data signal according to the second control signaling and the demodulation reference signal according to the demodulation reference signal pattern.

26. The apparatus of claim 14, wherein the data signal comprises an uplink shared channel signal, a downlink shared channel signal, an uplink control channel signal, or a downlink control channel signal.

27. A method for wireless communication at a user equipment (UE), comprising:
receiving first control signaling identifying a demodulation reference signal pattern that is uniformly distributed in a time domain and a frequency domain, the demodulation reference signal pattern comprising a first set of one or more resource elements for a demodulation reference signal, a second set of one or more resource elements for guard tones that are adjacent to and greater in frequency than the first set of one or more resource elements, and a third set of one or more resource elements for guard tones that are adjacent to and lower in frequency than the first set of one or more resource elements;
receiving second control signaling scheduling a data signal to be communicated between the UE and a network node in a set of time-frequency resources; and
communicating, across the set of time-frequency resources, the data signal according to the second control signaling and the demodulation reference signal according to the demodulation reference signal pattern.

28. The method of claim 27, wherein communicating the data signal and the demodulation reference signal further comprises:
    mapping the demodulation reference signal to the second set of one or more resource elements for the guard tones; and
    mapping the demodulation reference signal to the third set of one or more resource elements for the guard tones.

29. A method for wireless communication at a network node, comprising:
    outputting first control signaling identifying a demodulation reference signal pattern that is uniformly distributed in a time domain and a frequency domain, the demodulation reference signal pattern comprising a first set of one or more resource elements for a demodulation reference signal, a second set of one or more resource elements for guard tones that are adjacent to and greater in frequency than the first set of one or more resource elements, and a third set of one or more resource elements for guard tones that are adjacent to and lower in frequency than the first set of one or more resource elements;
    outputting second control signaling scheduling a data signal to be communicated between a user equipment (UE) and the network node in a set of time-frequency resources; and
    communicating, across the set of time-frequency resources, the data signal according to the second control signaling and the demodulation reference signal according to the demodulation reference signal pattern.

30. The method of claim 29, wherein communicating the data signal and the demodulation reference signal further comprises:
    mapping a zero-power signal to the second set of one or more resource elements for the guard tones; and
    mapping the zero-power signal to the third set of one or more resource elements for the guard tones.

* * * * *